United States Patent
Shiota et al.

(10) Patent No.: US 6,535,331 B2
(45) Date of Patent: Mar. 18, 2003

(54) WIDEBAND OPTICAL AMPLIFIER AND WIDEBAND VARIABLE WAVELENGTH OPTICAL SOURCE

(75) Inventors: Kazunori Shiota, Sendai (JP); Eiji Kanoh, Sendai (JP)

(73) Assignee: Advantest, Corp., Tokyo (JP)

( * ) Notice: Subject to any disclaimer, the term of this patent is extended or adjusted under 35 U.S.C. 154(b) by 0 days.

(21) Appl. No.: 09/761,991

(22) Filed: Jan. 16, 2001

(65) Prior Publication Data

US 2001/0033411 A1 Oct. 25, 2001

(30) Foreign Application Priority Data

Jan. 19, 2000 (JP) ........................ 2000-013997
Apr. 11, 2000 (JP) ........................ 2000-115821

(51) Int. Cl.[7] ............................. H01S 3/14; H01S 3/067
(52) U.S. Cl. ............... 359/341.32; 359/333; 359/341.1; 359/337.1; 359/337.11; 359/337.13; 359/337.2; 372/6; 372/94
(58) Field of Search ................. 359/337.1, 337.11, 359/337.13, 337.2, 341.22, 333; 372/6, 94

(56) References Cited

U.S. PATENT DOCUMENTS

| | | | | |
|---|---|---|---|---|
| 4,947,134 A | * | 8/1990 | Olsson | 359/173 |
| 5,406,411 A | * | 4/1995 | Button et al. | 359/341.33 |
| 5,481,399 A | | 1/1996 | Nagel et al. | 359/110 |
| 5,563,733 A | * | 10/1996 | Mitsuda et al. | 359/124 |
| 5,633,964 A | | 5/1997 | DiGiovanni et al. | 359/341 |
| 5,657,406 A | * | 8/1997 | Ball | 359/127 |
| 5,721,636 A | | 2/1998 | Erdogan et al. | 359/341 |
| 5,790,722 A | | 8/1998 | Minden et al. | 385/27 |
| 5,861,973 A | | 1/1999 | Imagati et al. | 359/337 |
| 5,867,291 A | * | 2/1999 | Wu et al. | 359/124 |
| 5,991,068 A | | 11/1999 | Massicott et al. | 359/337 |
| 6,008,932 A | | 12/1999 | Luo et al. | 358/337 |
| 6,049,418 A | * | 4/2000 | Srivastava et al. | 359/337.4 |
| 6,175,436 B1 | * | 1/2001 | Jackel | 359/124 |

FOREIGN PATENT DOCUMENTS

| | | | | |
|---|---|---|---|---|
| JP | 10-229238 | | 8/1998 | |
| JP | 02001102666 A | * | 4/2001 | ............. H01S/3/10 |

OTHER PUBLICATIONS

Mahdi et al. "Simultanious bi–directional of C–and L–band erbium doped fiber amplifier" OFCC 2000, Mar. 7–10, 2000, vol 1 pp 8–11.*

Desurvire "Analysis of gain difference between forward– and backward–pumped erbium–doped fiber amplifiers in the saruration regime" IEEE Photonics Tech. Letters vol. 4 No. 7 Jul. 1992, pp. 711–714.*

Yamashita et al. "Widely tunable erbium–doped fiber ring laser over 80–nm" APCC/OECC '99 Oct. 1999 vol. 2 pp. 1509–151.*

(List continued on next page.)

Primary Examiner—Thomas G. Black
Assistant Examiner—Stephen Cunningham
(74) Attorney, Agent, or Firm—Muramatsu & Associates

(57) ABSTRACT

A wideband optical amplifier for amplifying an input optical signal of known wavelength in one of at least two bands of wavelength has a significantly small number of optical components and thus is low cost. The wideband optical amplifier includes: a first set of a first optical coupler, a first pump light source, and a first erbium doped optical fiber (EDF) which is excited by the first pump light source; an optical switch for changing an output signal of the first set; and a second set of a second optical coupler, a second pump light source, and a second EDF which is excited by the second pump light source. The first set amplifies a first band of optical signal while a series connection of the first set and the second set amplifies a second band of optical signal. In another aspect, a wideband variable wavelength optical source is achieved by utilizing the wideband optical amplifier described above within a closed loop.

29 Claims, 18 Drawing Sheets

OTHER PUBLICATIONS

Becker et al. "Erbium doped fiber amplifiers" 1999, Academic Press pp. 251–318.*

Masuda et al. "High gain two-stage amplification with erbium–doped fibre amplifier" Electronics letters May 10, 1990 vol. 26, No. 1 pp. 661–662.*

Kim et al. "Wideband multiwavelength ebium–doped fiber ring laser" Mar. 7–10, 2000, OFCC '2000. vol. 3 pp. 8–10.*

Liaw et al. "Self–frequency–locked multiwavelength erbium doped fiber ring laser" LEOS'96 Nov. 18–19, 1996 vol. 2 pp. 24–25.*

Yamashita et al. "Widely tunable erbium doped fiber ring lasercovering both C–band and L–band" IEEE J on Sel. Topics in Quantum Elec. vol. 7, No. 1 Jan./Feb. 2001 pp. 41–43.*

Bellemare et al. "A broadly tunable erbium doped fiber ring laser: experimentation and Modeling" IEEE J on sel topics in Q Elec vol.7 No. 1 Jan./Feb. 2001 pp. 22–29.*

Mahdi et al. "long–wavelength–band Er doped fiber amplifier incorporating a ring laser as a seed signal" IEEE J on sel topics in Q Elec. vol. 7 No. 1 Jan./Feb. 2001 pp. 59–63.*

Sun et al. "80 nm ultra–wideband erbium doped silica fibre amplifier" elec. letts Nov. 6, 1997 vol. 33 No. 23 pp. 1965–1967.*

Sun et al. "Ultrawideband erbiumdoped silica fiber amplifier wth 80 nm of bandwidth" OAA Jul. 21–23, 1997 vol. 16 pp. 144–147.*

Sun et al. "An 80 nm utra wide band edfa with low noise figure and high output power" ECOC 97, Sep. 22–25, 1997, No. 448, pp. 69–72.*

Mahdi et al. "High gain bidirectional er doped fiber amplifier for conventional and long wavelength bands" IEEE Photonics Tech Letts. vol. 12 No. 11, Nov. 2000, pp. 1468–1470.*

* cited by examiner

WIDEBAND OPTICAL AMPLIFIER AND WIDEBAND VARIABLE WAVELENGTH OPTICAL SOURCE

FIELD OF THE INVENTION

This invention relates to a wideband optical amplifier and a wideband variable wavelength optical source. More particularly, this invention relates to a wideband optical amplifier that can amplify optical signals with wavelengths ranging from 1.55 μm band (C-band: 1.53–1.565 μm) to 1.58 μm band (L-band: 1.565–1.60 μm) and a wideband variable wavelength optical source using such an optical amplifier.

BACKGROUND OF THE INVENTION

Optical communication systems and devices using optical fiber cables require wideband optical amplifiers and optical sources. FIG. 1 shows an example of such a wideband optical amplifier in the conventional technology. This example is a wideband optical amplifier for amplifying optical signals ranging from C-band to L-band. The more details of which is shown in Japanese Patent Laid Open No. Hei 10-229238 and "Electron Letter, 33, pp 710, 1997, M. Yamada et. al." This conventional example is briefly explained here with reference to FIG. 1.

As shown in the block diagram of FIG. 1, the wideband optical amplifier is mainly comprised of a C-band optical amplifier 100, an L-band optical amplifier 200, an optical demultiplexer and an optical multiplexer. The wideband optical amplifier receives an input optical signal 10s and produces an output optical signal 62s by amplifying the input optical signal 10s.

The C-band optical amplifier 100 includes a first optical isolator 11, a first erbium doped optical fiber (EDF) 21, a first pump light source 31, a WDM (Wavelength Division Multiplexing) coupler 31c, and a second optical isolator 12. The L-band optical amplifier 200 includes a third optical isolator 13, a second pump light source 32, a WDM coupler 32c, a second erbium doped optical fiber (EDF) 22, a third pump light 33, a WDM coupler 33c, and a fourth optical isolator 14. In this example, the optical demultiplexer and optical multiplexer are a WDM coupler 61 and a WDM coupler 62, respectively.

The input optical signal 10s provided to the WDM coupler (demultiplexer) 61 is divided into optical signals $10s_1$, and $10s_2$. The optical signal $10s_1$ is supplied to the first optical isolator 11 in the C-band optical amplifier 100 and the optical signal $10s_2$ is supplied to the third optical isolator 13 in the L-band optical amplifier. Instead of the WDM coupler 61, other type of optical demultiplexer or an optical switch may be used.

In the C-band optical amplifier, the first optical isolator 11 blocks the light moving in the opposite direction, i.e., backward scattering lights, and provides the input optical signal 11s to the first erbium doped optical fiber 21. Thus, by the first optical isolator 11, unwanted lights, such as pumping lights in a backward direction are blocked from travelling toward the input side.

The first erbium doped optical fiber 21 is used as an amplifying medium and has a fiber length optimized to amplify signals in the C-band. For instance, the first erbium doped optical fiber 21 has a fiber length of 20 m (meter). The first erbium doped optical fiber 21 receives a pump light from the first pump light source 31 through the WDM coupler 31c. Based on a laser operation in the rare earth element (erbium) doped fiber, the first erbium doped optical fiber 21 amplifiers the input signal 11s by several ten dB, such as 20 dB or more, to produce an amplified optical signal 21s. The second optical isolator 12 receives the amplified optical signal and produces an optical signal 12s at its output. The second optical isolator 12 blocks lights propagating in the backward direction.

As noted above, the first pump light source 31 and the WDM coupler 31c provide the pump light to excite the first erbium doped optical fiber 21. In this example, the pump light source 31 is placed at the back side of the first erbium doped optical fiber 21 so that the pump light travels in the backward direction (backward pumping).

In the L-band optical amplifier 200, the third optical isolator 13 blocks the light moving in the opposite direction, i.e., backward scattering lights, and provides the input optical signal 14s to the second erbium doped optical fiber 22 through the WDM coupler 32c. By the third optical isolator 13, unwanted lights, such as pumping lights in the backward direction are blocked from travelling toward the input side.

The L-band optical amplifier 200 works the same way as the C-band optical amplifier 100. The second erbium doped optical fiber 22 is configured to have a fiber length most suitable for amplifying L-band optical signals. For example, the second erbium doped optical fiber 22 has a fiber length of 120 m (meter). As noted above, the second pump light source 32 is provided between the third optical isolator 13 and the second erbium doped optical fiber 22. Further, the third pump light source 33 is provided between the fourth optical isolator 14 and the second erbium doped optical fiber 22. Under this configuration, an L-band light signal can be amplified by several ten dB, for example, 20 dB or more.

As noted above, in order for the second erbium doped optical fiber 22 to amplify the L-band light signal, the length of the erbium doped optical fiber must be relatively long, for example, 120 m. Since the second erbium doped optical fiber 22 is long, it requires bidirectional pumping or high power pump lights to excite the optical fiber. In the example of FIG. 1, the pump light sources 32 and 33 are provided both the front side and back side of the second erbium doped optical fiber 22 (bidirectional pumping).

The WDM coupler (optical multiplexer) 62 is used for combining two input lights, from the C-band and L-band optical amplifiers, respectively, and producing a combined optical signal at its output. Namely, the WDM coupler 62 receives the C-band optical signal 12s from the C-band optical amplifier 100 and the L-band optical signal 13s from the L-band optical amplifier 200 and outputs a combined optical signal 62s. Instead of the WDM coupler 62 noted above, other type of optical multiplexer or an optical switch may be used.

As described in the foregoing with reference to FIG. 1, in the wideband optical amplifier ranging from the C-band to L-band, the optical signals passing through the optical isolators 11 and 13, which limit the direction of the signals, are amplified by the erbium doped optical fibers 21 and 22 excited by the corresponding pump lights from the pump light sources 31, 32, and 33. The amplified optical signals are output through the corresponding optical isolators 12 and 14. In such an arrangement, it is known that the bandwidth or band of wavelengths of the optical amplifier can be controlled by varying the fiber length of the erbium doped optical fibers 21 and 22 and the intensity of the pump lights. For example, by increasing the fiber length of the erbium doped optical fibers, the wavelength of the signals to be amplified is increased.

As explained in the foregoing, in the conventional wideband optical amplifier of FIG. 1, for amplifying optical signals ranging from the C-band to L-band, several pump lights must be used. Further, the optical isolators are required at both the input side and the output side of each of the C-band and L-band amplifiers. Moreover, the optical demultiplexer and multiplexer are also necessary to divide and combine the light signals. Because the conventional optical amplifier requires many optical components, the amplifier involves a relatively large insertion loss as well as high cost. Moreover, the optical amplifier needs to have erbium doped optical fibers of considerable lengths. For example, as noted above, the optical amplifier includes both the first erbium doped optical fiber of 20 m for the C-band amplifier and the second erbium doped optical fiber of 120 m for the L-band amplifier.

SUMMARY OF THE INVENTION

It is, therefore, an object of the present invention to provide a wideband optical amplifier for amplifying an input optical signal of known wavelength in one of at least two bands of wavelength with a significantly small number of optical components.

It is another object of the present invention to provide a wideband optical amplifier for amplifying an input optical signal of known wavelength in one of at least two bands of wavelength with a simple structure and low cost.

It is a further object of the present invention to provide a wideband optical amplifier for amplifying an input optical signal of known wavelength in one of at least two bands of wavelength which has an improved signal-to-noise ratio while reducing cost and a number of components.

It is a further object of the present invention to provide a wideband variable wavelength optical source for generating an optical signal ranging at least two bands of wavelength with a simple structure and low cost.

To achieve the above object, the first aspect of the wideband optical amplifier of the present invention includes: a first set of a first optical coupler, a first pump light source, and a first erbium doped optical fiber for exciting the first erbium doped optical fiber by a first pump light from the first pump light source; an optical switch for changing paths for an output signal of the first set; and a second set of a second optical coupler, a second pump light source, and a second erbium doped optical fiber for exciting the second erbium doped optical fiber by a second pump light from the second pump light source.

The first set constitutes a first optical amplifier for a first band of amplification and a second optical amplifier for a second band of amplification by a combination of the first set and the second set constitutes. The first and second erbium doped optical fibers are adjusted in lengths and/or density of erbium doping to match the first and second bands of amplification.

The second aspect of the present invention is a wideband variable wavelength optical source utilizing the wideband optical amplifier noted above for generating an optical signal in one of at least two bands of wavelength. The wideband variable wavelength optical source includes: a first optical amplifier having a first optical coupler, a first pump light source, and a first erbium doped optical fiber for exciting the first erbium doped optical fiber by a first pump light from the first pump light source; an optical switch for changing paths for an output signal of the first optical amplifier; an amplifier block having a second optical coupler, a second pump light source, and a second erbium doped optical fiber for exciting the second erbium doped optical fiber by a second pump light from the second pump light source; a second optical amplifier formed by connecting the first optical amplifier and the amplifier block in series through the optical switch; a variable wavelength optical filter for selecting a wavelength of the optical signal to be generated by the wideband variable wavelength optical source; and an optical demultiplexer for forming a closed loop by returning the optical signal from the variable wavelength optical filter to an input of the first optical amplifier and producing the optical signal as an output.

The first and second erbium doped optical fibers are adjusted in lengths and/or density of erbium doping to match the first and second bands of amplification. Alternatively, a length of the first erbium doped optical fiber is adjusted to match the first band and a sum of lengths of the first erbium doped optical fiber and the second erbium doped optical fiber is adjusted to match the second band.

The third aspect of the present invention is a wideband optical amplifier having at least two bands of wavelength for amplifying an input optical signal of known wavelength and having an improved signal-to-noise (S/N) ratio. The wideband optical amplifier includes: a first optical amplifier for amplifying a first band optical signal and formed of a first optical coupler, a first pump light source, and a first erbium doped optical fiber for exciting the first erbium doped optical fiber by a first pump light from the first pump light source; an optical switch for changing paths for an output signal of the first optical amplifier; and a second optical amplifier for amplifying a second band optical signal which is longer in wavelength than that of the first band and formed of the first optical amplifier and a second amplifier block having a second optical coupler, a second pump light source, and a second erbium doped optical fiber for exciting the second erbium doped optical fiber by a second pump light from the second pump light source wherein the second optical amplifier includes means for removing an amplified spontaneous emission (ASE) light in the first band from the second erbium doped optical fiber.

The means for removing the amplified spontaneous emission (ASE) light in the first band is a wavelength selective optical coupler which couples the second pump light to the second erbium doped optical fiber and prevents the ASE light in the first band from passing therethrough. Alternatively, the means for removing the amplified spontaneous emission (ASE) light in the first band is an optical filter which prevents the ASE light in the first band from passing therethrough.

According to the present invention, the wideband optical amplifier can eliminate expensive optical components by a series connection of the first and second optical amplifiers. Thus, significant cost reduction as well as reduction in size can be achieved. Moreover, the fiber length of the second erbium doped optical fiber is decreased, and the power level of the pump light for pumping the second erbium doped optical fiber can be accordingly decreased, resulting in further reduction in size and cost. The wideband variable wavelength optical source using the wideband optical amplification can also achieve the same advantages noted above. Further, the wideband optical amplifier can improve the signal-to-noise (S/N) ratio in the L-band amplification by incorporating a filter function that blocks the amplified spontaneous emission (ASE) in the C-band wavelength.

DETAILED DESCRIPTION OF THE PREFERRED EMBODIMENTS

Figure 1:
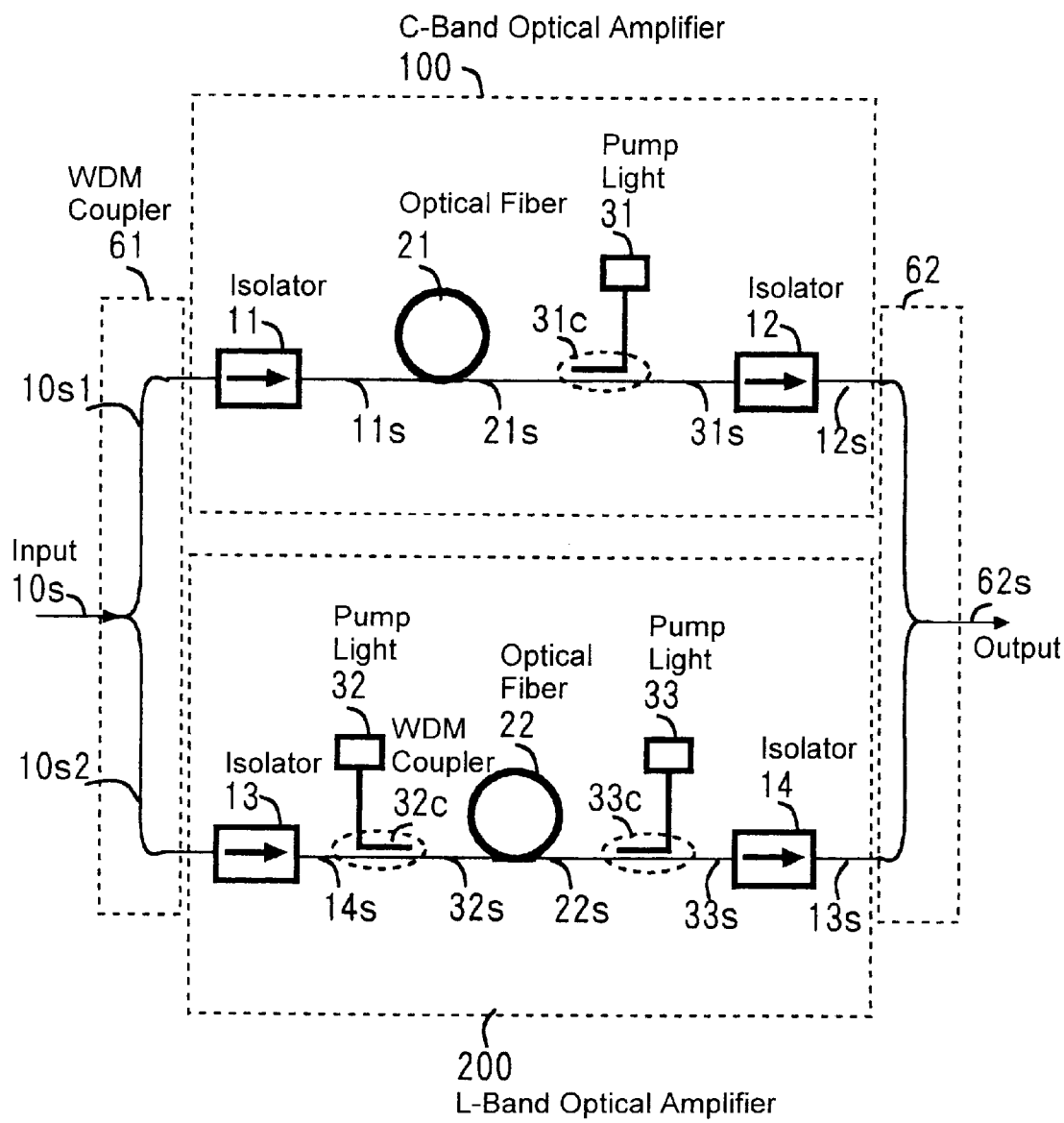
FIG. 1 is a schematic block diagram showing an example of structure in the wideband optical amplifier in the conventional technology.

The present invention is described in more detail with reference to the accompanying drawings. FIGS. 2–14 show the preferred embodiments of the wideband optical amplifier and wideband variable wavelength optical source of the present invention. In FIGS. 2–14, components identical to that shown in the conventional example of FIG. 1 are denoted by the same reference numerals. In the present invention, it is presumed that, in an actual application of optical amplifiers, the wavelength of the input optical signal is predetermined and known to a user.

Figure 2:
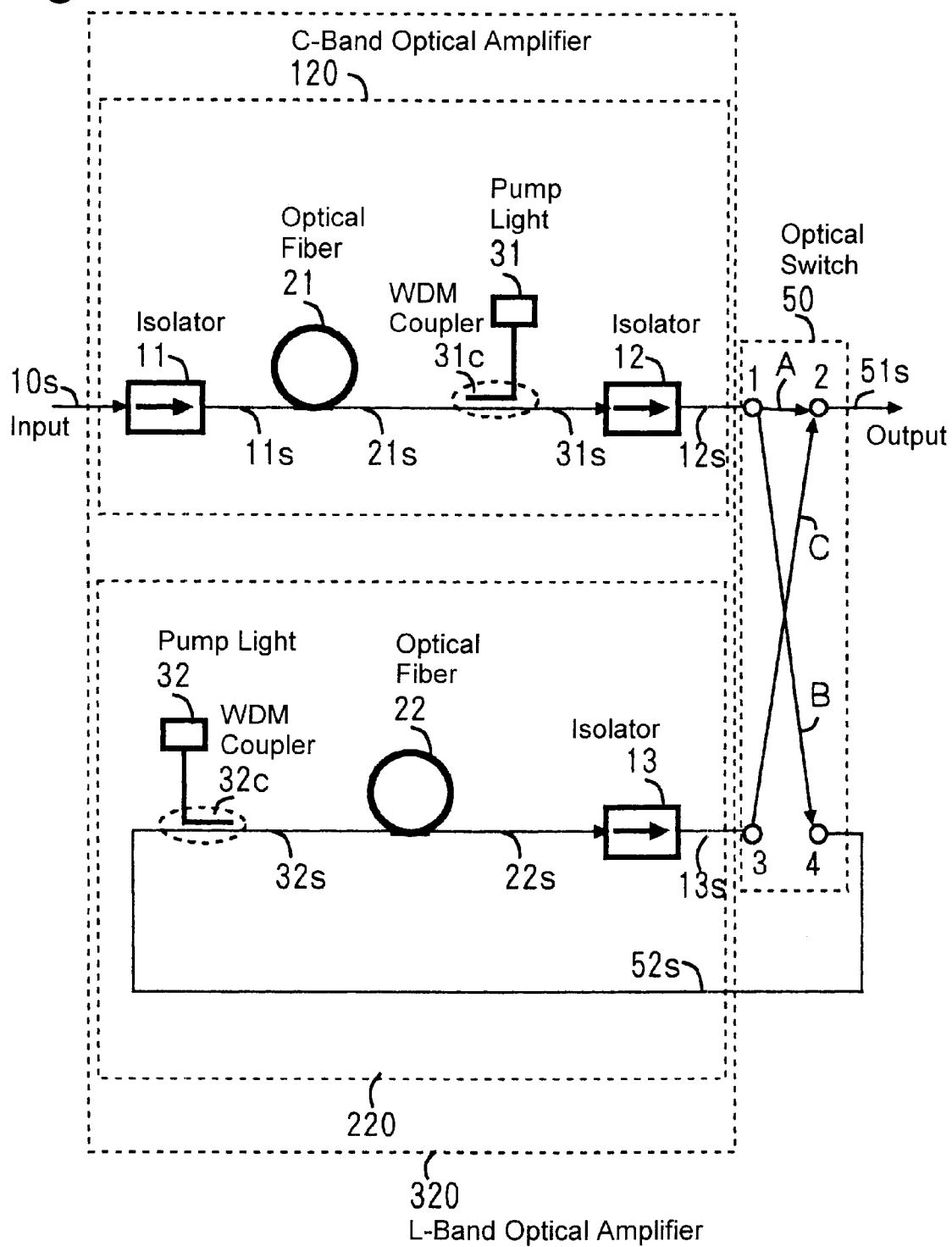
FIG. 2 is a schematic block diagram showing an example of structure in the wideband optical amplifier of the present invention.

In FIG. 2, the wideband optical amplifier is mainly composed of a C-band optical amplifier 120, an L-band optical amplifier 320 with an L-band block (amplifier block) 220, and an optical switch 50. The L-band optical amplifier 320 is created by the combination of the C-band amplifier 120 and the L-band block 220. In this configuration of FIG. 2, the WDM coupler (optical demultiplexer) 61 for dividing a light signal and the WDM coupler (optical multiplexer) 62 for combining light signals shown in FIG. 1 are no longer used. Moreover, in the present invention of FIG. 2, the number of the optical isolators, pump lights, WDM coupler are reduced from the conventional example of FIG. 1 while the optical switch 50 is added.

The wideband optical amplifier of FIG. 2 is an amplifier which is capable of amplifying an optical signal in one of at least two bands of wavelength (C-band and L-band) and is presumed that the wavelength of the input optical signal 11s is uniform and known in advance. Thus, when the input optical signal 11s has a wavelength in the C-band, the C-band optical amplifier 120 amplifies the input optical signal and directly outputs the amplified signal 51s from the optical switch 50, i.e, through terminals 1–2 (arrow A) in the optical switch 50. When the input optical signal 11s has a wavelength in the L-band, the L-band amplifier 320, which is the combination of the C-band optical amplifier 120 and the L-band block 220, amplifies the input signal and outputs the amplified signal 51s from the optical switch 50. Thus, in the L-band amplification, the input signal travels through the C-band optical amplifier 120, the optical switch 50 (from terminal 1 to 4; arrow B), the L-band block 220, and the optical switch 50 (from terminal 3 to 2).

The C-band optical amplifier 120 includes a first optical isolator 11, a first erbium doped optical fiber (EDF) 21, a first pump light 31, a WDM (Wavelength Division Multiplexing) coupler 31c, and a second optical isolator 12. The L-band block 220 includes a second pump light 32, a second WDM coupler 32c, a second erbium doped optical fiber (EDF) 22, and a third optical isolator 13.

The optical switch 50 is a switch for changing between two modes of optical signal paths in the manner noted above. In the first mode (arrow A), i.e., a C-band amplifier, the optical switch 50 produces a C-band optical signal from the C-band optical amplifier 120 at the output terminal 2. In the second mode, i.e., an L-band amplifier, the optical switch 50 forms a signal path between the terminals 1 and 4 (arrow B) as well as a signal path between the terminals 3 and 2, and produces an L-band optical signal through the C-band optical amplifier and the L-band block 220. The operation of the optical switch 50 is controlled by a switch signal from an outside controller (not shown).

In the first mode (C-band amplifier), upon receiving the input optical signal 10s in the C-band, the C-band optical amplifier 120 produces an optical signal 12s at the output of the second optical isolator 12. The optical signal 12s increases its power (amplified) by, for example, more than 20 dB and passes through the optical switch 50 as an output optical signal 51s. The fiber length of the first erbium doped optical fiber 21 is the same as that in the conventional example of FIG. 1, for example, 20 m (meter).

In the second mode (L-band amplifier), upon receiving the input optical signal 10s in the L-band, the C-band optical amplifier 120 produces a mixture signal of the optical signal 10s in the L-band and an amplified spontaneous emission (ASE) light in the C-band induced by the first erbium doped optical fiber 21. The mixture signal passes through the optical switch 50 (arrow B; from terminal 1 to 4) and is provided to the L-band block 220 of the L-band optical amplifier 320.

In the L-band block 220 of the L-band optical amplifier 320, the fiber length of the second erbium doped optical fiber 22 is 100 m (meter) which is different from that in the conventional example of FIG. 1 by 120 m−100 m=20 m. Upon receiving the optical signal 52s that is a combination of the ASE light and the optical signal 10s, and exciting the second erbium doped optical fiber 22 by the ASE light and the second pump light 32, the optical signal in the L-band is amplified by, for example 20 dB or more. The amplified signal 13s through the third optical isolator 13 and the optical switch 50 is output as an optical signal 51s.

In the optical amplifier of the present invention, when the fiber length of the first erbium doped optical fiber 21 is denoted by X and the fiber length of the second erbium doped optical fiber 22 is denoted by Y, the overall length required for amplifying the L-band signal is the sum of the lengths of the erbium doped optical fibers 21 and 22, i.e., X+Y, which is 120 m (meter). Since the first erbium doped optical fiber 21 is 20 m long, the second erbium doped optical is 100 m long to achieve the overall length of 120 m. Thus, in the present invention, the second erbium doped optical fiber 22 is shorter than that of the conventional example of FIG. 1 by 20 m, resulting in cost reduction. As is known in the art, the other factors for adjusting the wavelength bands of amplification include doping density of erbium in the first and second optical fibers 21 and 22 and power intensity of the pump lights applied to the optical fibers 21 and 22.

Further in the present invention, the second erbium doped optical fiber 22 is excited by the ASE light from the C-band optical amplifier 120 in addition to the pump light from the pump light source 32. Thus, only one pump light is sufficient to achieve the gain of 20 dB or more which is comparable to that of the conventional example of FIG. 1 using the two pump lights. Alternatively, when using the same number of pump light sources as that of the conventional example, the power level of the pump lights in the present invention can be decreased to achieve the same result.

In the wideband optical amplifier of the present invention, as shown in FIG. 2, the L-band optical amplifier 320 is established by series connecting the C-band optical amplifier 120 and the L-band block 220. The C-band optical signal is amplified by the C-band amplifier while the L-band optical signal is amplified by the L-band block 220 when travelling through the C-band amplifier and the L-band block 220. The WDM coupler 61 (optical demultiplexer) 61 and the WDM coupler (optical multiplexer) 62 are no longer used, and the overall number of pump lights is reduced. Accordingly, although the cost is dramatically reduced, the wideband optical amplifier of the present invention has substantially the same capability as that of the conventional example.

Figure 3:
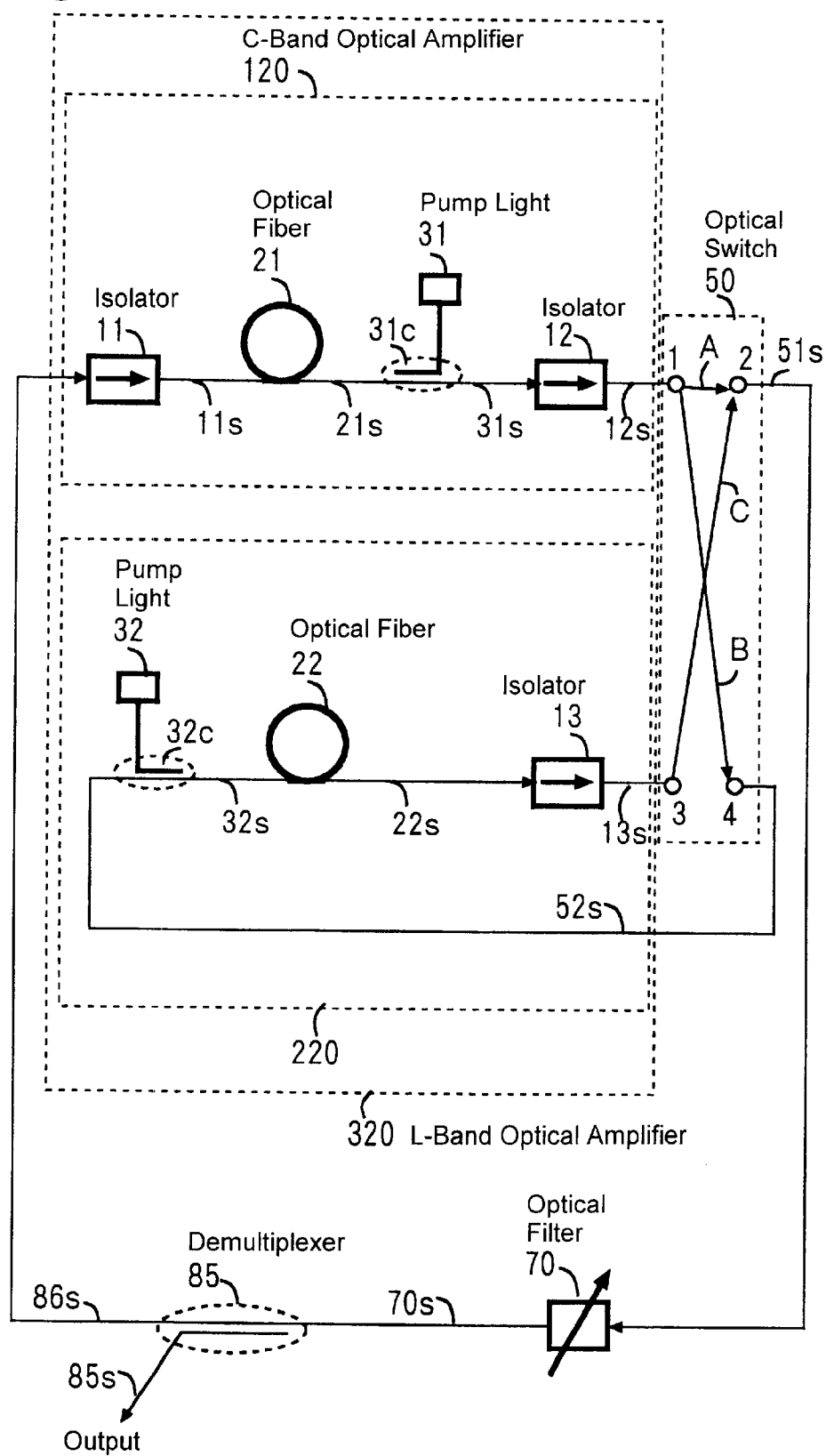
FIG. 3 is a schematic block diagram showing an example of structure in the wideband variable wavelength optical source of the present invention.

FIG. 3 shows a structure of wideband variable wavelength optical source of the present invention. In this example, the wideband variable wavelength optical source utilizes the wideband optical amplifier of FIG. 2. The optical source of FIG. 3 includes the C-band optical amplifier 120, the optical switch 50, the L-band optical amplifier 320 which is the combination of the C-band optical amplifier 120 and the L-band block 220 connected in series, a variable wavelength optical filter 70 and an optical demultiplexer 85.

The output terminal of the optical switch 50 connects to the input terminal of the variable wavelength optical filter 70. The output terminal of the variable wavelength optical filter 70 connects to the input terminal of the first optical isolator 11 through the optical demultiplexer 85. An optical signal 85s from the optical demultiplexer 85 is an output of the wideband variable wavelength optical source.

Since the configuration of FIG. 3 includes a feedback loop, i.e., a fiber ring (resonator), it achieves laser oscillation. The oscillation wavelength (frequency) is regulated by operating the optical switch 50 which changes either the C-band or L-band and tuning the variable wavelength optical filter 70 which defines a wavelength for which the closed loop (fiber ring) has a loop gain greater than unity to start oscillation.

For generating a C-band light, the optical switch 50 establish a signal path so that an output signal 12s of the C-band optical amplifier 120 is supplied to the variable wavelength optical filter 70 through the terminal 1 to 2 (arrow A) in the optical switch 50. The output of the variable wavelength optical filter 70 returns to the input of the C-band optical amplifier. For generating an L-band light, the optical switch 50 establishes a signal path so that the signal travels through the C-band optical amplifier 120, the optical switch 50 (from terminal 1 to 4; arrow B), the L-band block 220, the optical switch 50 (from terminal 3 to 2), the variable wavelength optical filter 70, and to the input of the C-band optical amplifier.

The variable wavelength optical filter 70 is an optical filter whose pass band wavelengths can be regulated freely by a control signal (not shown) . Thus, the variable wavelength optical filter 70 is a bandpass filter. Upon receiving the optical signal 51s from the output port of the optical switch 50, the variable wavelength optical filter 70 allows to pass therethrough the optical signal having the wavelengths defined by the control signal. Such wavelengths are within at least the C-band or L-band. To generate lights with high quality, it is preferable that the variable wavelength filter has a narrow bandwidth, i.e., high selectivity.

The optical demultiplexer 85 receives the optical signal 70s from the variable wavelength optical filter 70 and outputs optical signals 85s and 86s by dividing the optical signal 70s. One divided optical signal 86s is provided to the first optical isolator 11 in the C-band optical amplifier to form the closed loop. The other divided optical signal 85s is an output signal of the wideband variable wavelength optical source of the present invention.

According to the present invention, as shown in FIG. 3, the variable wavelength optical source is achieved which ranges from the C-band to the L-band with relatively simple configuration.

The concept of the present invention is not limited to the specific structures in the embodiments described above. The present invention can be implemented in other configurations depending on the specific needs. The followings describe examples of such modification with reference to the drawings.

Figure 4:
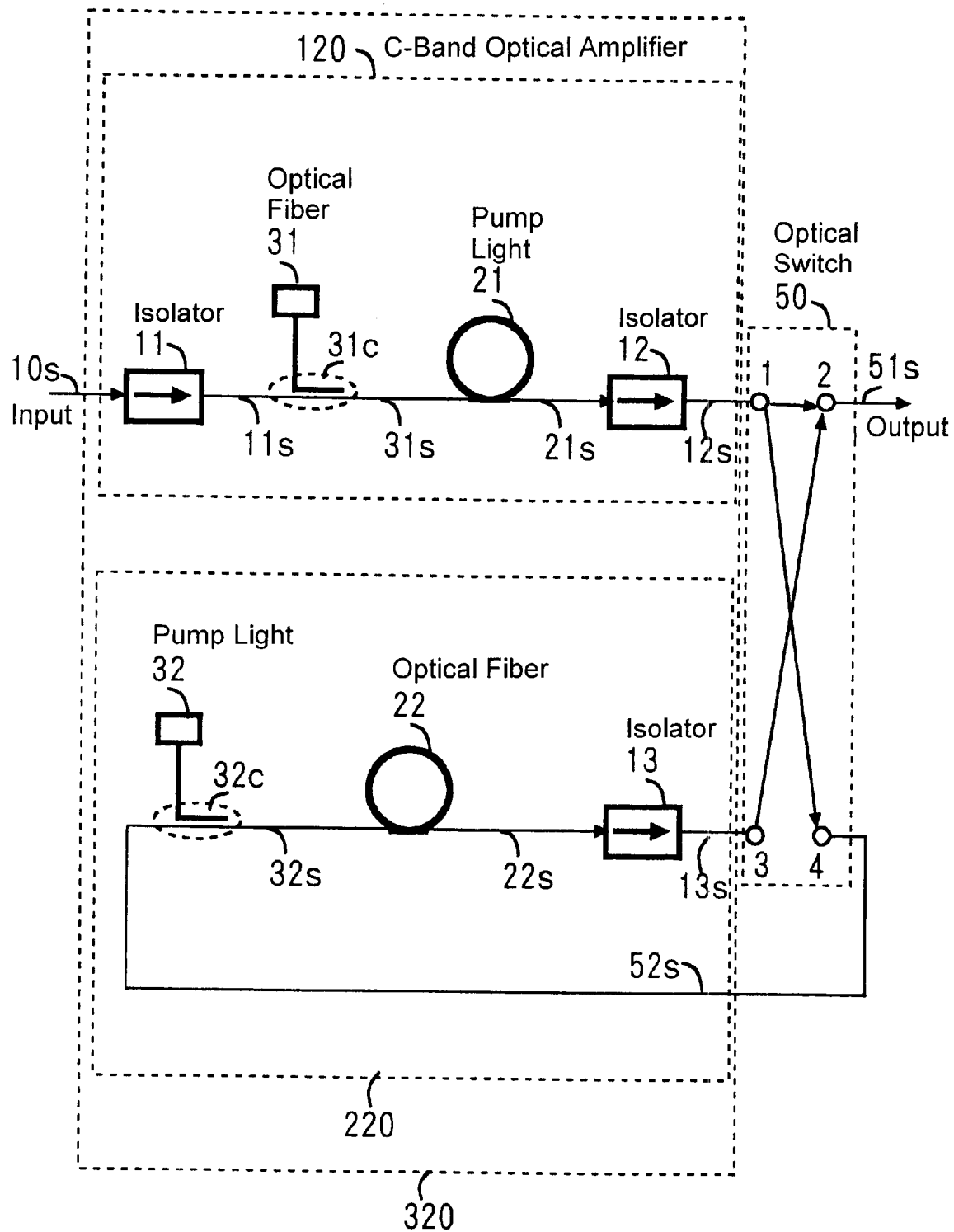
FIG. 4 is a schematic block diagram showing a further example of structure in the wideband optical amplifier of the present invention.

The first modification of the wideband optical amplifier is shown in FIG. 4. In the wideband optical amplifier shown in FIG. 2, the first pump light source 31 is provided at the back side of the first erbium doped optical fiber 21 for backward pumping the first erbium doped optical fiber 21. In the example of FIG. 4, the first pump light source 31 and the WDM coupler 31c are provided at the front side of the first erbium doped optical fiber 21 for forward pumping the first erbium doped optical fiber 21.

Figure 5:
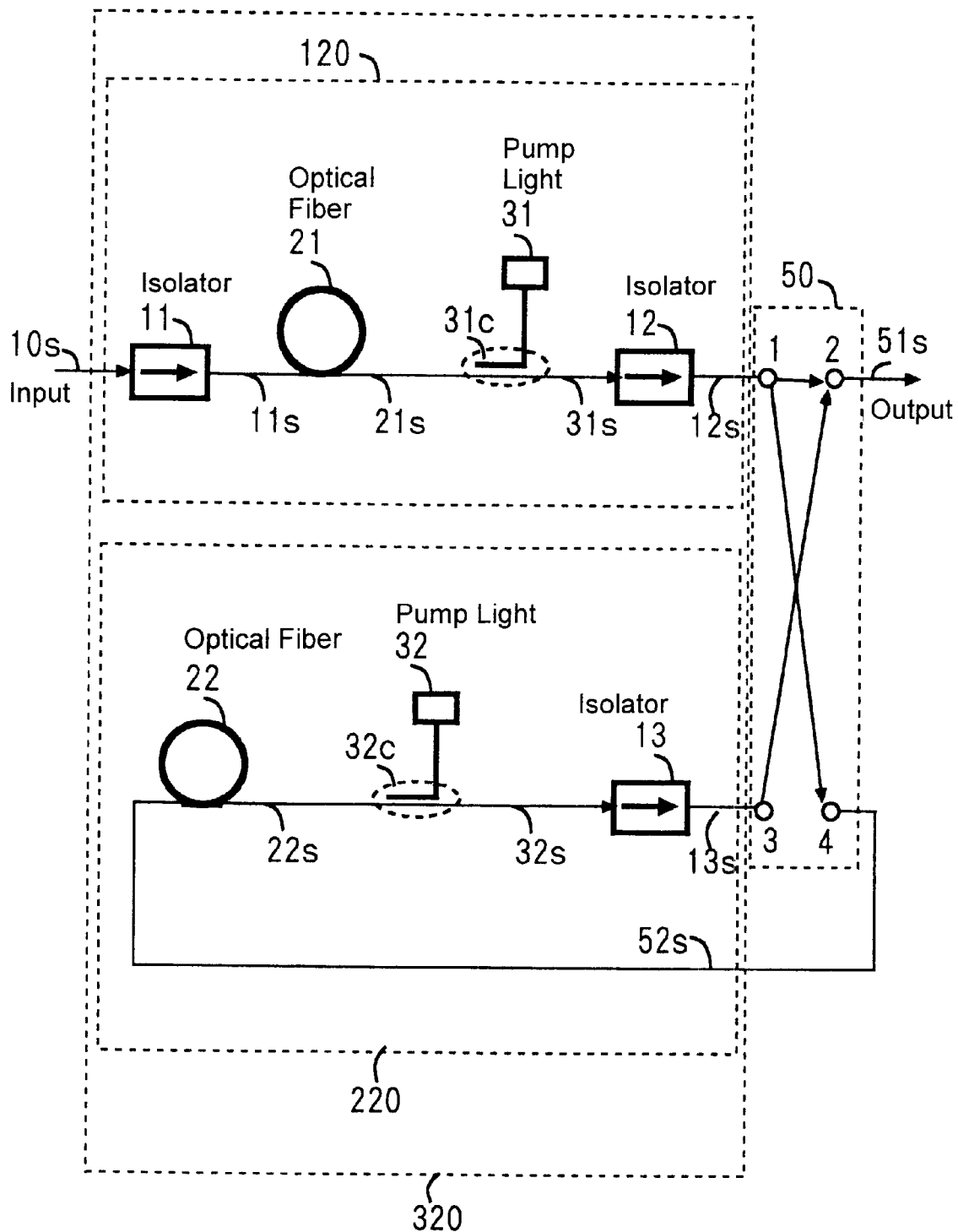
FIG. 5 is a schematic block diagram showing a further example of structure in the wideband optical amplifier of the present invention.

FIG. 5 shows the second modification of the wideband optical amplifier of the present invention. In the wideband optical amplifier shown in FIG. 2, the second pump light source 32 is provided at the front side of the second erbium doped optical fiber 22 for forward pumping the second erbium doped optical fiber 22. In the example of FIG. 5, the second pump light source 32 and the WDM coupler 32c are provided at the back side of the second erbium doped optical fiber 22 for backward pumping the second erbium doped optical fiber 22.

Figure 6:
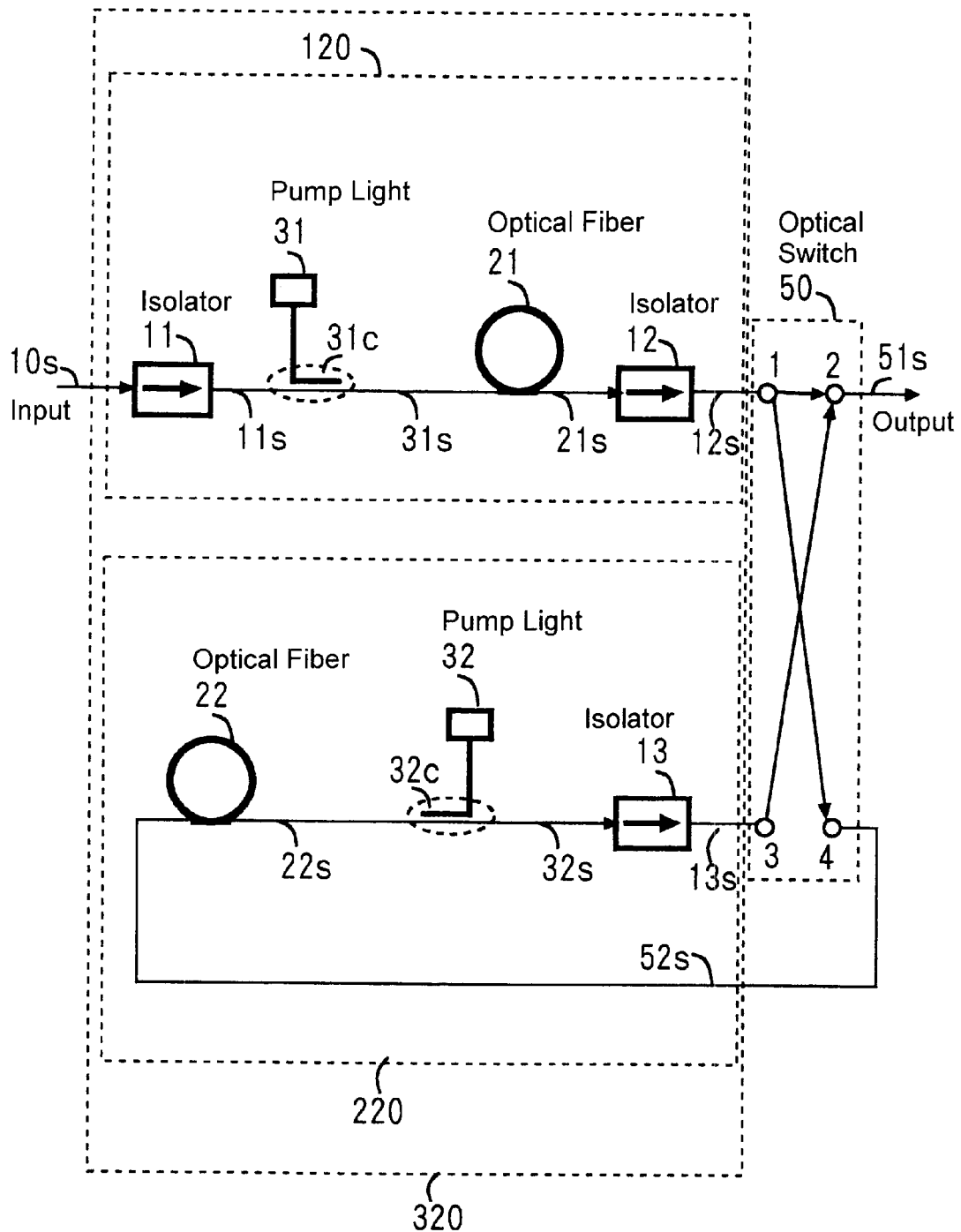
FIG. 6 is a schematic block diagram showing a further example of structure in the wideband optical amplifier of the present invention.

FIG. 6 shows the third modification of the wideband optical amplifier of the present invention. In this example, similar to the example of FIG. 4, the first pump light source 31 and the WDM coupler 31c are provided at the front side of the first erbium doped optical fiber 21 for forward pumping the first erbium doped optical fiber 21. Further, similar to the example of FIG. 5, the second pump light source 32 and the WDM coupler 32c are provided at the back side of the second erbium doped optical fiber 22 for backward pumping the second erbium doped optical fiber 22.

Figure 7:
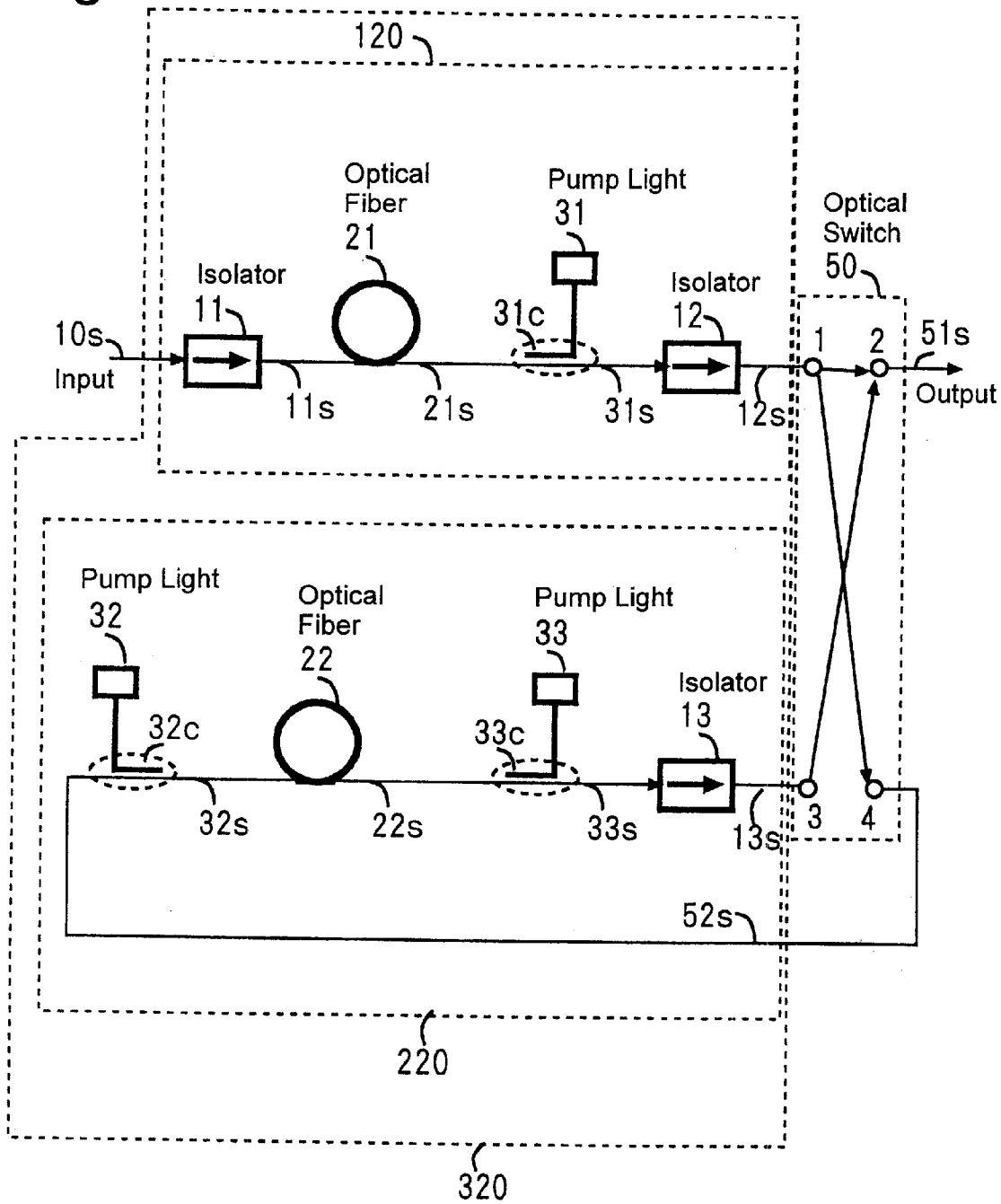
FIG. 7 is a schematic block diagram showing a further example of structure in the wideband optical amplifier of the present invention.

FIG. 7 shows the fourth modification of the wideband optical amplifier of the present invention. In the wideband optical amplifier shown in FIG. 2, the second pump light source 32 is provided at the front side of the second erbium doped optical fiber 22 for forward pumping the second erbium doped optical fiber 22. In the example of FIG. 7, the second pump light source 32 and the WDM coupler 32c are provided at the front side of the second erbium doped optical fiber 22 for forward pumping the second erbium doped optical fiber 22. Further, a third pump light 33 and a WDM coupler 33c are provided at the back side of the second erbium doped optical fiber 22 for backward pumping the second erbium doped optical fiber 22. Therefore, second pump light 32 and the third pump light 33 excite the second erbium doped optical fiber 22 through the bidirectional pumping.

Figure 8:
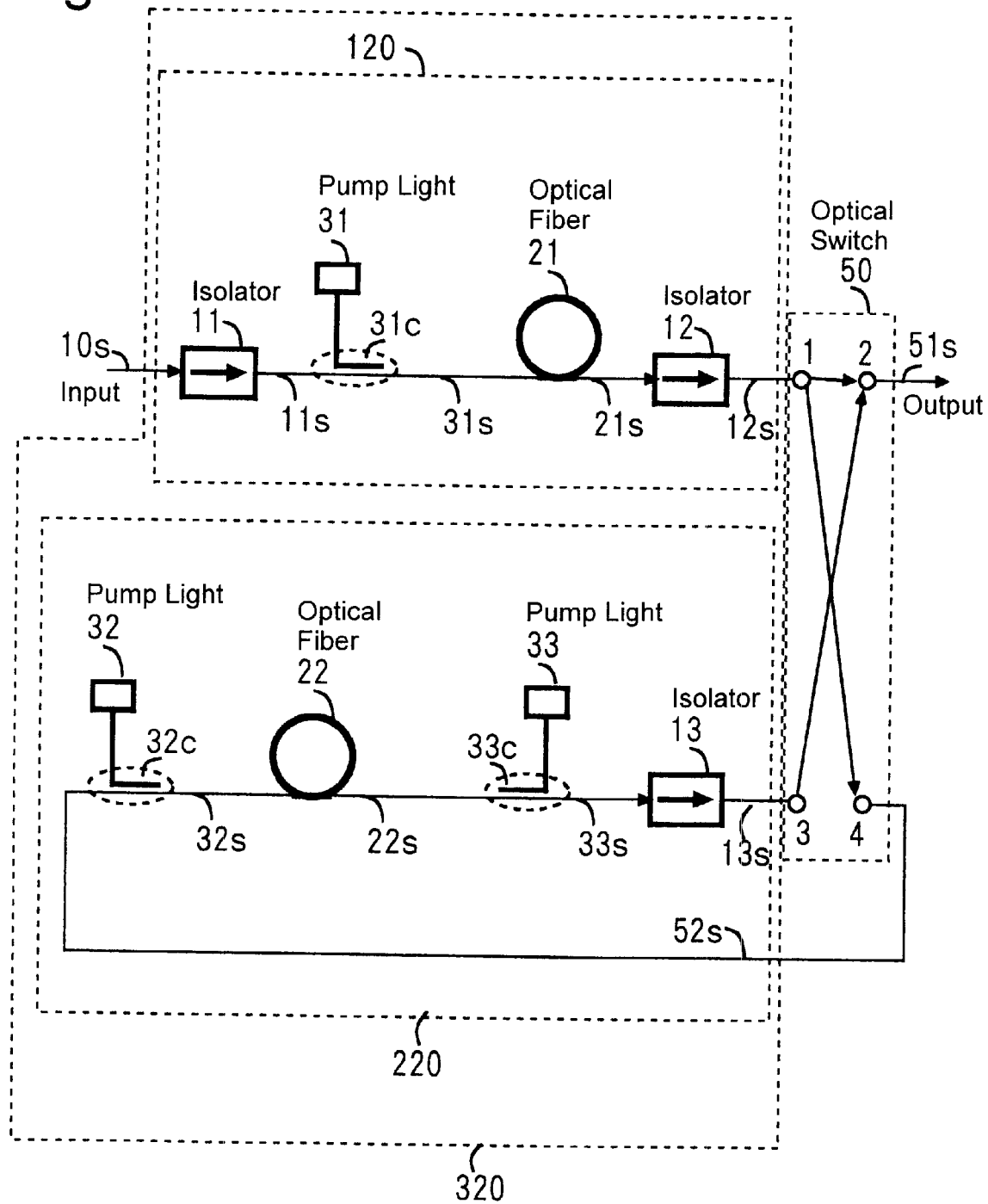
FIG. 8 is a schematic block diagram showing a further example of structure in the wideband optical amplifier of the present invention.

FIG. 8 shows the fifth modification of the wideband optical amplifier of the present invention. In the wideband optical amplifier shown in FIG. 7, the first pump light source 31 is provided at the back side of the first erbium doped optical fiber 21 for backward pumping the first erbium doped optical fiber 21. In the example of FIG. 8, the first pump light source 31 and the WDM coupler 31c are provided at the front side of the first erbium doped optical fiber 21 for forward pumping the first erbium doped optical fiber 21.

Figure 9:
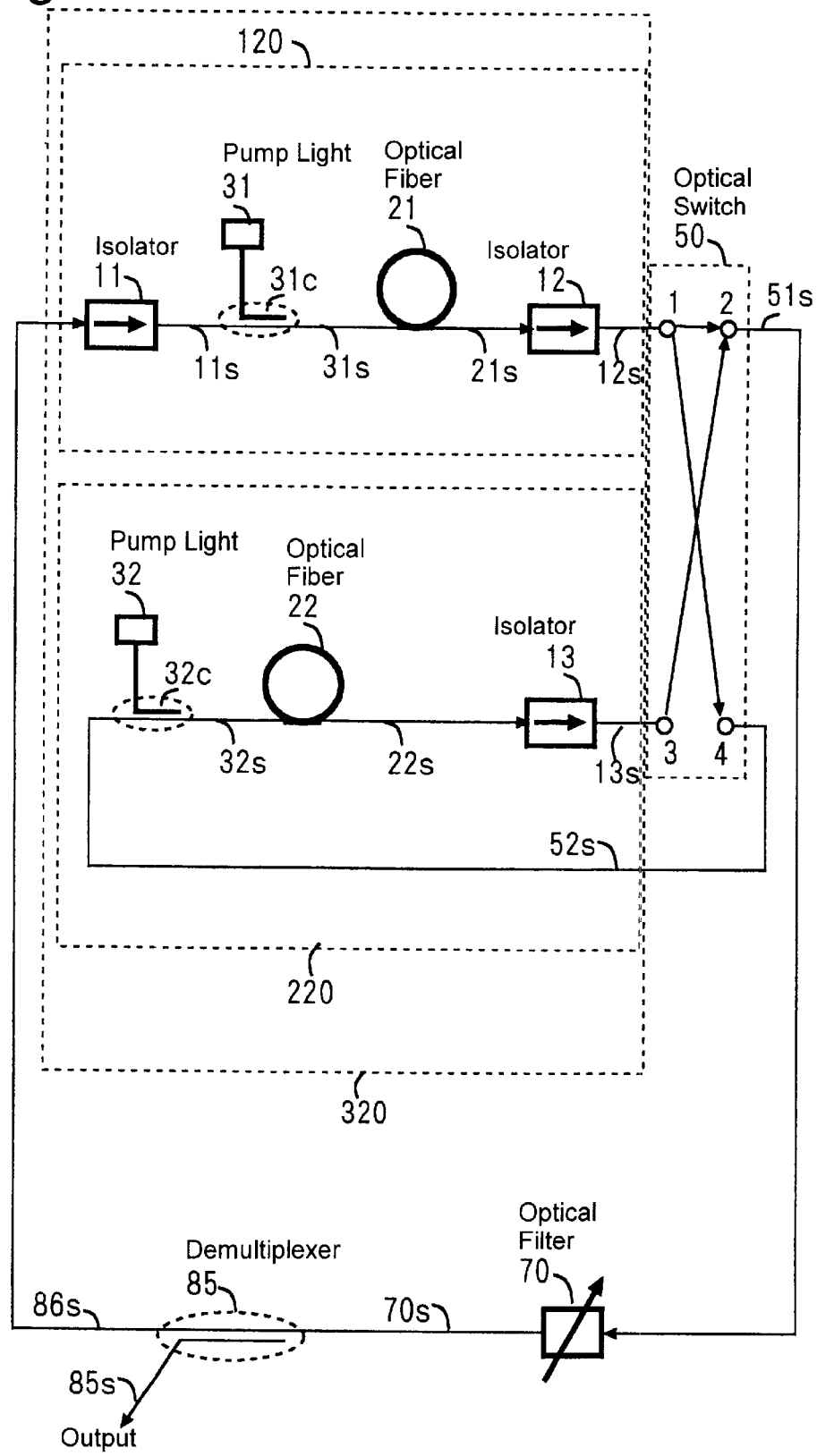
FIG. 9 is a schematic block diagram showing a further example of structure in the wideband variable wavelength optical source of the present invention.

FIGS. 9–13 show the variations of the wideband variable wavelength optical source of the present invention. The first modification of the wideband variable wavelength optical source is shown in FIG. 9. In the wideband optical amplifier shown in FIG. 3, the first pump light source 31 is provided at the back side of the first erbium doped optical fiber 21 for backward pumping the first erbium doped optical fiber 21. In the example of FIG. 9, the first pump light source 31 and the WDM coupler 31c are provided at the front side of the first erbium doped optical fiber 21 for forward pumping the first erbium doped optical fiber 21.

Figure 10:
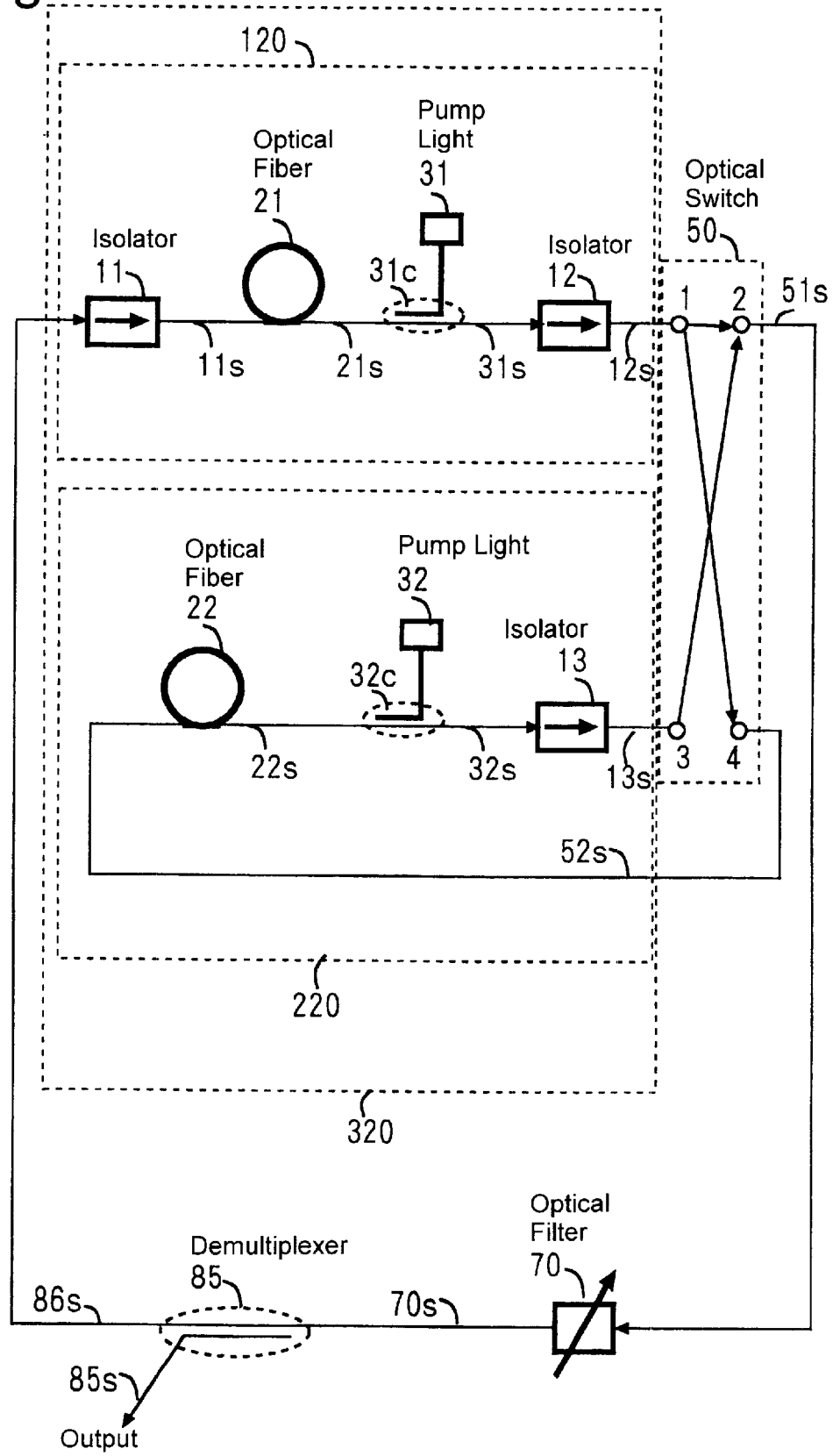
FIG. 10 is a schematic block diagram showing a further example of structure in the wideband variable wavelength optical source of the present invention.

FIG. 10 shows the second modification of the wideband variable wavelength optical source of the present invention. In the wideband optical amplifier shown in FIG. 3, the second pump light source 32 is provided at the front side of the second erbium doped optical fiber 22 for forward pumping the second erbium doped optical fiber 22. In the example of FIG. 10, the second pump light source 32 and the WDM coupler 32c are provided at the back side of the second erbium doped optical fiber 22 for backward pumping the second erbium doped optical fiber 22.

Figure 11:
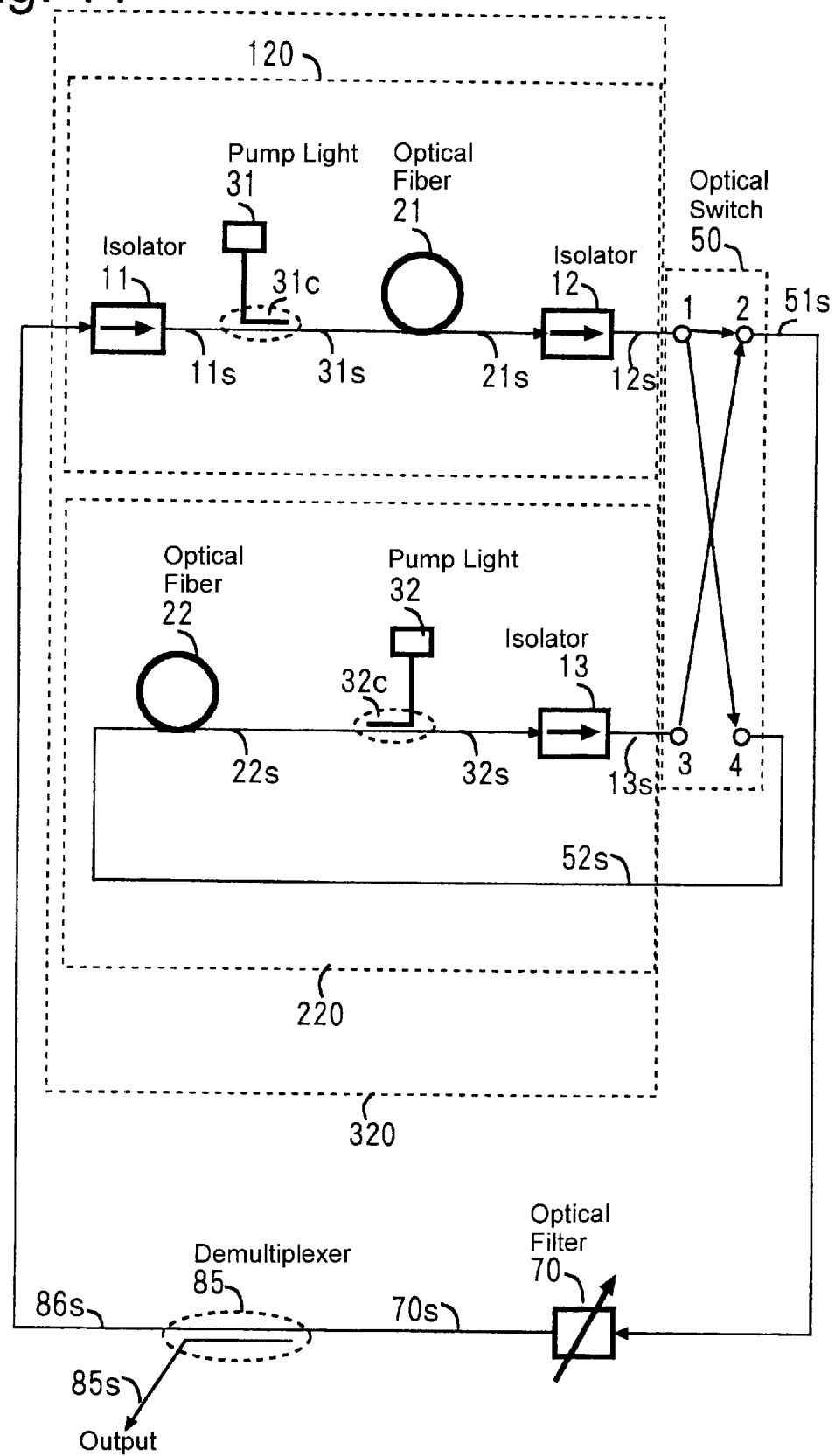
FIG. 11 is a schematic block diagram showing a further example of structure in the wideband variable wavelength optical source of the present invention.

FIG. 11 shows the third modification of the wideband variable wavelength optical source of the present invention. In this example, similar to the example of FIG. 9, the first pump light source 31 and the WDM coupler 31c are provided at the front side of the first erbium doped optical fiber 21 for forward pumping the first erbium doped optical fiber 21. Further, similar to the example of FIG. 10, the second pump light source 32 and the WDM coupler 32c are provided at the back side of the second erbium doped optical fiber 22 for backward pumping the second erbium doped optical fiber 22.

Figure 12:
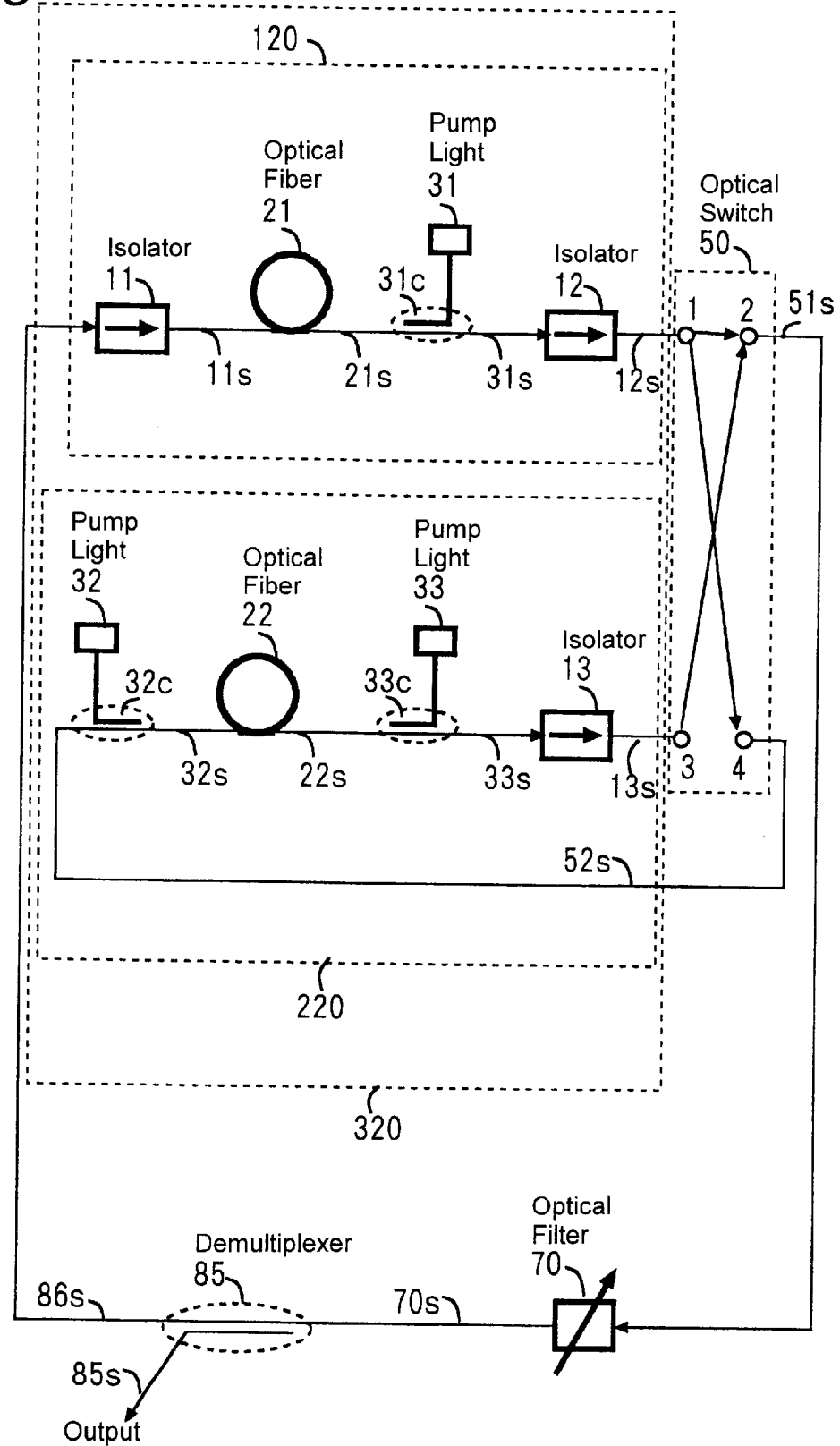
FIG. 12 is a schematic block diagram showing a further example of structure in the wideband variable wavelength optical source of the present invention.

FIG. 12 shows the fourth modification of the wideband variable wavelength optical source of the present invention. In the wideband variable wavelength optical source shown in FIG. 3, the second pump light source 32 is provided at the front side of the second erbium doped optical fiber 22 for forward pumping the second erbium doped optical fiber 22. In the example of FIG. 12, the second pump light source 32 and the WDM coupler 32c are provided at the front side the second erbium doped optical fiber 22 for forward pumping the second erbium doped optical fiber 22. Further, a third pump light 33 and a WDM coupler 33c are provided at the back side of the second erbium doped optical fiber 22 for backward pumping the second erbium doped optical fiber 22. Therefore, second pump light 32 and the third pump light 33 excite the second erbium doped optical fiber 22 through the bidirectional pumping.

Figure 13:
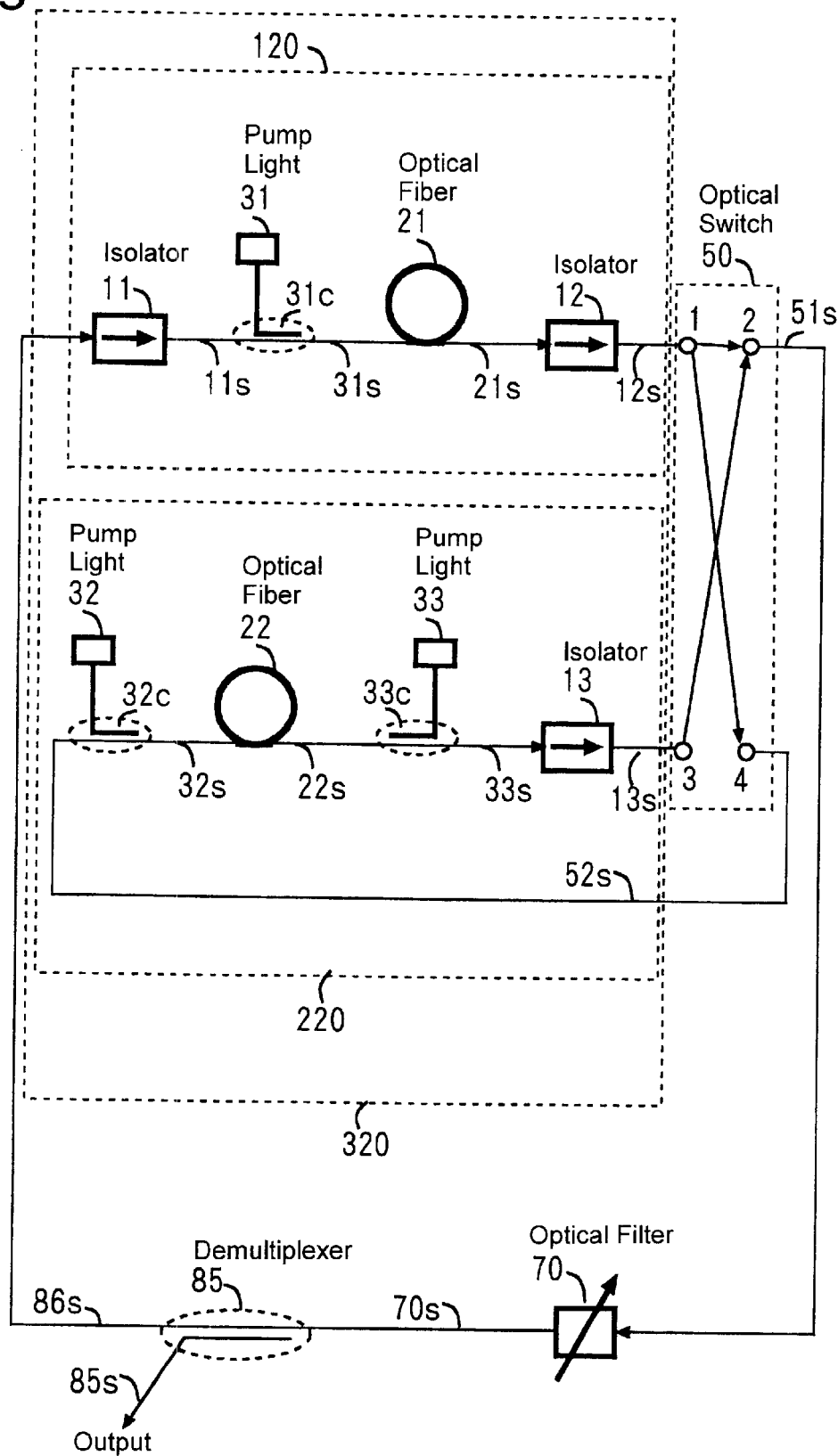
FIG. 13 is a schematic block diagram showing a further example of structure in the wideband variable wavelength optical source of the present invention.
Figure 14:
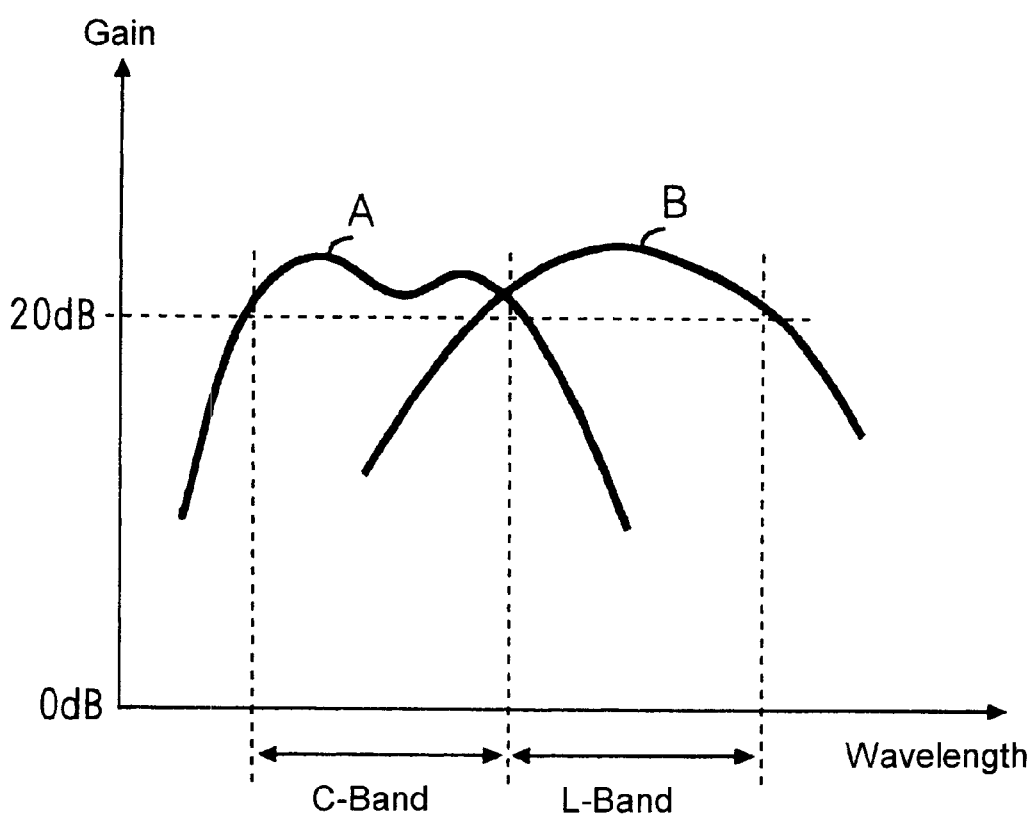
FIG. 14 is a graph showing a characteristic of the wideband optical amplifier of the present invention for amplifying optical signals of C-band and L-band by switching between the bands with an optical switch.

FIG. 13 shows the fifth modification of the wideband variable wavelength optical source of the present invention. In the wideband optical amplifier shown in FIG. 12, the first pump light source 31 is provided at the back side of the first erbium doped optical fiber 21 for backward pumping the first erbium doped optical fiber 21. In the example of FIG. 13, the first pump light source 31 and the WDM coupler 31c are provided at the front side of the first erbium doped optical fiber 21 for forward pumping the first erbium doped optical fiber 21.

The concept of the present invention is not limited to the embodiments above. For example, in the foregoing embodiments, two optical amplifiers, i.e, the C-band optical amplifier 120 and the L-band optical amplifier 320 are incorporated. However, three or more optical amplifiers of different bands may be provided which are connected in series through optical switches to amplify optical signals having three or more wavelengths. Further, an equalizer may be added to the back side of the wideband optical amplifier to flattening the frequency (wavelength) characteristics of the amplifier gain.

In the wideband optical amplifier and the variable wavelength optical source of the present invention, a signal-to-noise (S/N) ratio in the L-band amplification may be lower than that of the C-band amplification. This is because the ASE (Amplified Spontaneous Emission) light from the C-band optical amplifier is used for pumping the second erbium doped optical fiber in the L-band optical amplifier. FIGS. 14–18 show the present invention having means for improving the signal-to-noise ratio in the optical signal through the L-band amplification.

Figure 15:
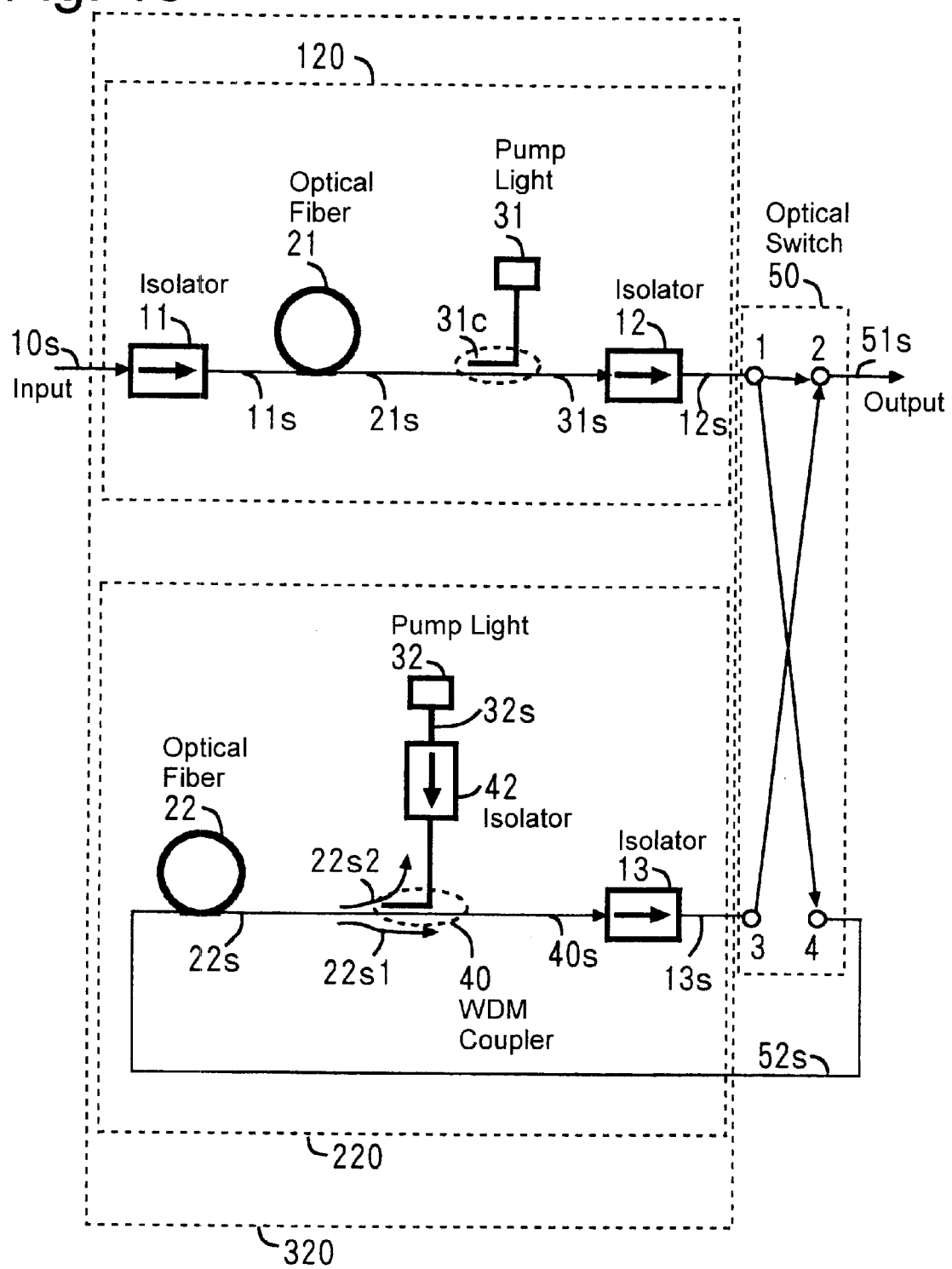
FIG. 15 is a schematic block diagram showing an example of structure in the wideband optical amplifier of the present invention that can improve a signal-to-noise (S/N) ratio in amplifying L-band optical signals.
Figure 16:
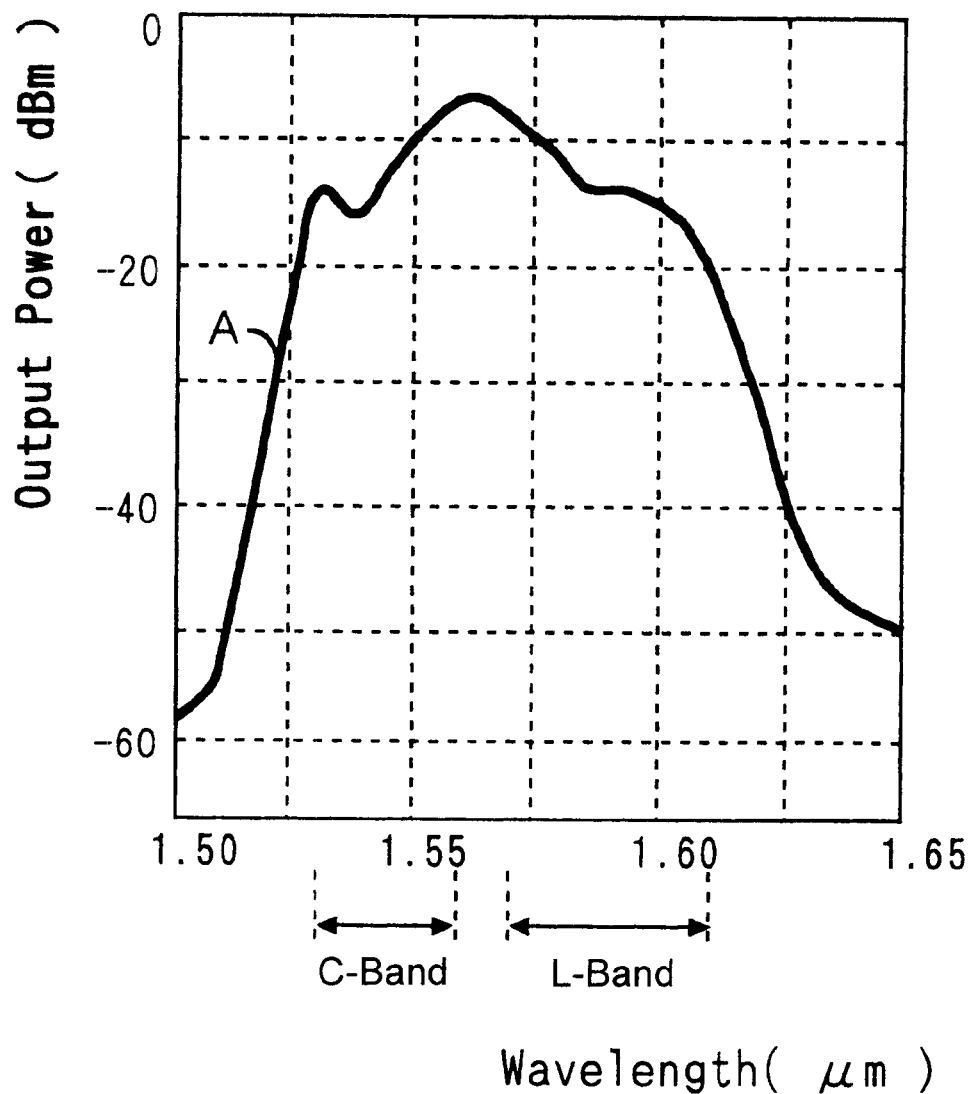
FIG. 16 is a graph showing optical spectrum in an ASE (Amplified Spontaneous Emission) lights from the second erbium doped optical fiber in the wideband optical amplifier of the present invention when pass/reflection wavelengths are not specified in the WDM coupler.
Figure 17:
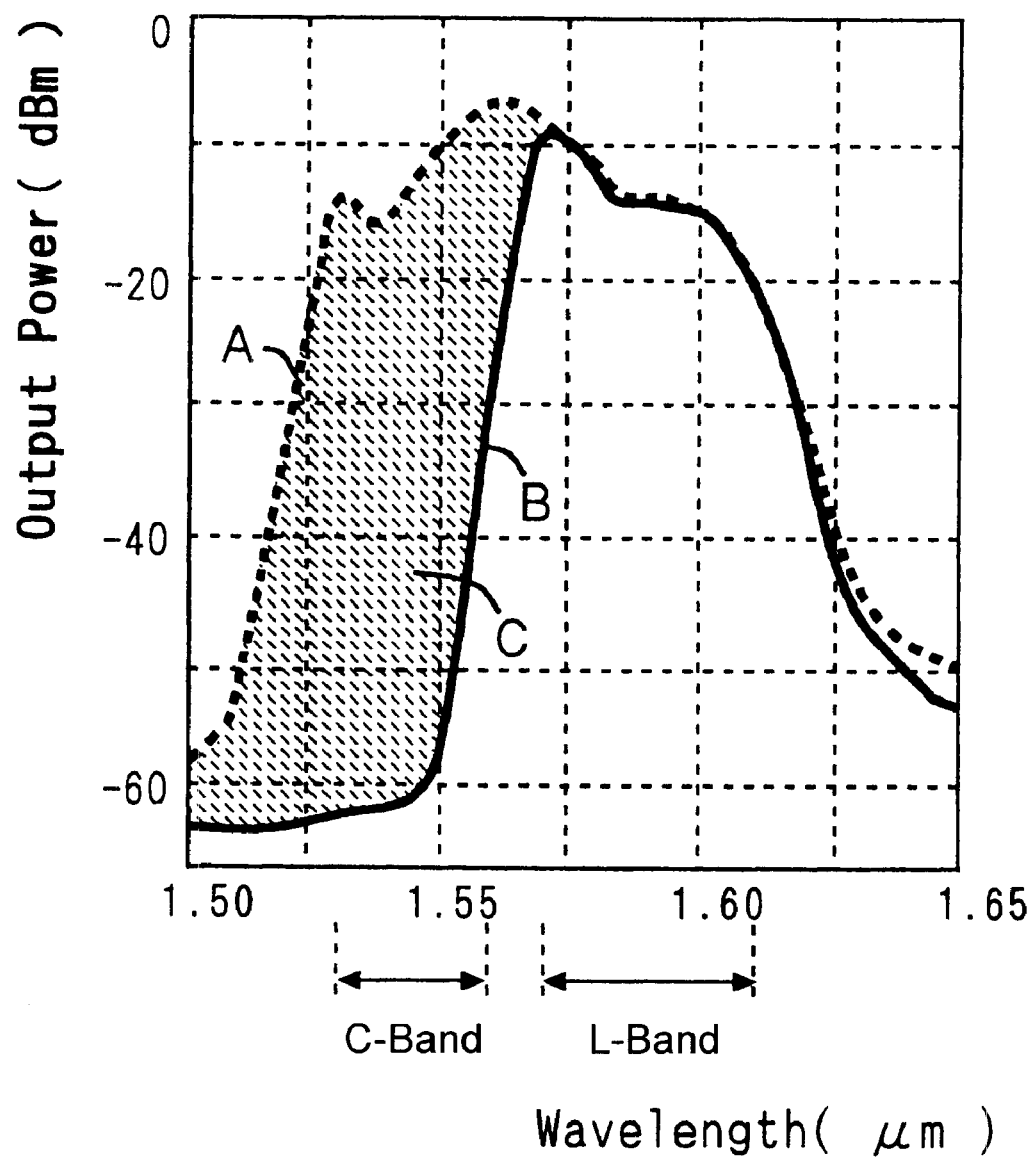
FIG. 17 is a graph showing optical spectrum of an improved signal-to-noise ratio in the ASE lights from the second erbium doped optical fiber in the wideband optical amplifier of the present invention when the wavelength in the WDM coupler is specified to separate the wavelengths in the C-band from the L-band.

FIG. 15 shows an example of structure in the wideband optical amplifier of the present invention that has an improved signal-to-noise (S/N) ratio in the L-band amplification. FIG. 16 shows an example of optical spectrum in the ASE light that is output from the second erbium doped optical fiber 22 without using any measure for reducing the ASE noise such as a wavelength selective WDM coupler. FIG. 17 shows an example of optical spectrum in the ASE light when using the wavelength selective WDM coupler as a means for separating the C-band from the L-band.

In addition to the example of FIG. 5, the wideband optical amplifier of FIG. 15 includes a fourth optical isolator 42 and a wavelength selective WDM (Wavelength Division Multiplexing) coupler 40 to form the L-band block 220 in the L-band optical amplifier 320. Namely, the second WDM coupler 32c in FIG. 5 is replaced with the fourth optical isolator 42 and the wavelength selective WDM coupler 40.

In the L-band amplification where the output of the C-band optical amplifier 120 is supplied to the input of the L-band block 220 through the optical switch 50, the optical signal 52s from the C-band optical amplifier 120 is an optical signal that is a mixture of induced emission and spontaneous emission. The induced emission involves optical components emitted by stimulation based on the input optical signal 10s. The spontaneous emission involves optical components which are amplified spontaneous emission (ASE) lights other than the induced emission.

The second erbium doped optical fiber 22 receives the optical signal 52s and the second pump light 32s from the second pump light source 32. Both the induced emission and the spontaneous emission are performed in the second erbium doped optical fiber 22. The optical signal 22s includes an amplified optical signal and the ASE lights. Namely, since the first and second erbium doped optical fibers are designed to amplify the L-band signal, the optical signal 22s is a mixture of the amplified component induced by the L-band optical signal 10s and the component resulted from the amplified spontaneous emission (ASE). The ASE lights exist even when the input optical 10s is not supplied to the optical amplifier. The ASE lights extend in the wide range from the C-band to the L-band.

In the configuration of FIG. 15, the fourth optical isolator 42 provides the pump light 32s from the second pump light source 32 to the second erbium doped optical fiber 22 through the WDM coupler 40. The optical isolator 42 blocks the optical signal flowing back from the WDM coupler 40. Thus, it is possible to prevent the unwanted optical component $22s_2$ from coming to the second pump light source 32. In the case where the second pump light source 32 has an optical isolator of its own therein, the fourth optical isolator 42 is unnecessary.

The optical spectrum in the optical signal 22s from the second erbium doped optical fiber 22 is shown in FIG. 16. When the optical signal 10s is not supplied to the input of the C-band optical amplifier 120, the optical signal 22s is consists of only the amplified spontaneous emission (ASE) lights produced based on the pump lights in the amplifier. Thus, the characteristic curve A in FIG. 16 shows the spectrum of the ASE lights which has a wide range of wavelengths including the C-band and the L-band. The spectrum of ASE lights based on the spontaneous emission is an unwanted noise in terms of optical amplification of the input optical signal 10s. Thus, the ASE lights are the cause that deteriorates the signal-to-noise (S/N) ratio in the output optical signal 51s.

The wavelength selective WDM coupler 40 shown in FIG. 15 is a WDM coupler which functions as an optical multiplexer as in the second WDM coupler 32c in FIGS. 2–13. Further, the wavelength selective WDM coupler 40 has a filter function for prohibiting the C-band or shorter wavelengths from passing therethrough. In operation, the WDM coupler 40 works as an optical multiplexer for coupling the second pump light 32c from the second pump light source 32 to the second erbium doped optical fiber 22. Further, upon receiving the optical signal 22s from the second erbium doped optical fiber 22 that is a mixture of the amplified optical signal and the amplified spontaneous emission (ASE) light, the WDM coupler 40 works as an optical filter.

Since the wavelength selective WDM coupler 40 is designed to prevent the C-band components, only the optical signal $22s_1$ in the L-band (the mixture of the amplified optical signal and the ASE light in the L-band) travels through the WDM coupler 40 as an optical signal 40s. The ASE light $22s_2$ in the C-band is divided toward the second pump light source 32.

As a result, as shown in the characteristic curve B in FIG. 17, the ASE light in the C-band is blocked and only the spectrum in the L-band is output as the optical signal 40s. The optical signal 40s propagates through the third optical isolator 13 as the optical signal 51s.

The wavelength selective WDM coupler 40 is known in the art, an example of which is a WDM coupler formed by multi-layers of dielectric material. In such an example, thin films of dielectric material having different refraction coefficients are overlapped one another so that the optical signals having the wavelength which matches the phase of the refraction from the multi-layered films is reflected while the others are allowed to pass therethrough. Thus, by defining parameters such as thickness of the dielectric thin films, the number of the thin films, and the refraction coefficients of thin film material, a wavelength selective WDM coupler is achieved which blocks wavelengths in the C-band or shorter.

With use of the wavelength selective WDM coupler 40, the wideband optical amplifier of the present invention can remove the ASE light in the C-band from the L-band amplified signal. Thus, the S/N ratio in the optical signal 51s is improved, thereby achieving the L-band optical amplifier with lower noise.

The spectrum of the ASE light from the wavelength selective WDM coupler 40 is further explained with reference to the example of FIG. 17. The characteristic curve A shown in FIG. 17 is the spectrum of the ASE light from the second erbium doped optical fiber 22 in FIG. 5 when no input optical signal is supplied. The characteristic curve B in FIG. 17 is the spectrum of ASE light passing through the wavelength selective WDM coupler 40. The comparison of the both spectrum reveals that the spectrum of the ASE light in the C-band or shorter wavelengths ASE light is reduced, which significantly improves the S/N ratio in the L-band optical amplifier of the present invention.

More specifically, when the power of the first pump light 31s is 90 mW and the power of the second pump light 32s is 60 mW, the power level of the ASE light is +8.44 dBm in the optical amplifier of FIG. 5 while the power level of the ASE light is reduced to +3.71 dBm in the optical amplifier of FIG. 15. Thus, the resultant difference, 8.44−3.71=4.73 dB, is the degree of reduction in the ASE light power which is significant improvement especially when amplifying an input optical signal of low power level. In applications of test and measurement instruments, such a reduction in the floor noise significantly improves sensitivity and accuracy in measuring optical signals.

Figure 18:
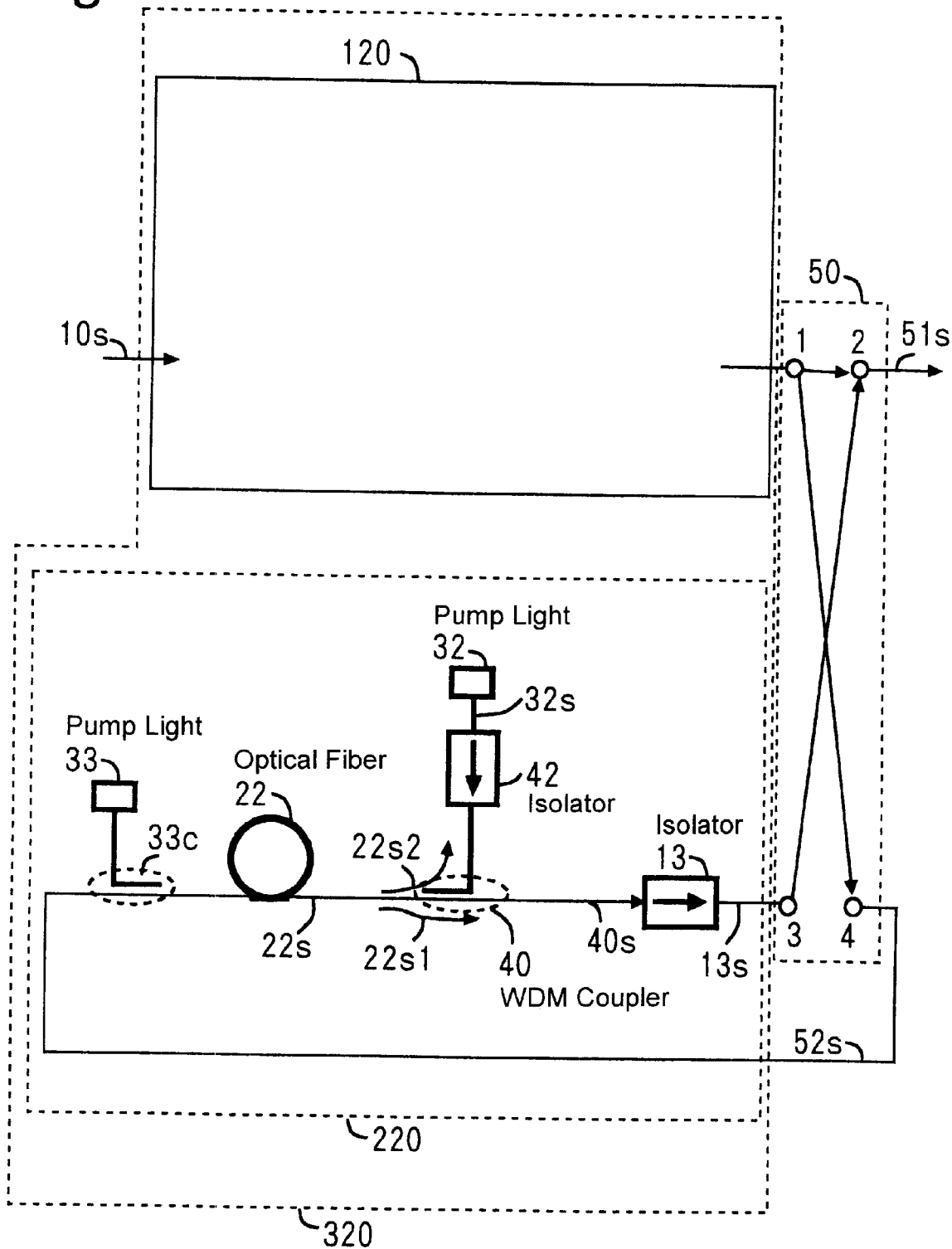
FIG. 18 is a schematic block diagram showing a further example of structure in the L-band amplifier in the wideband optical amplifier of the present invention.

It should be noted that the configuration in FIG. 15 is merely an example for illustration purpose. Various other forms are possible within the scope of the present invention. For example, as shown in FIG. 18, the L-band block 220 in the L-band optical amplifier 32 includes two pump light sources for achieving the bidirectional pumping. The improvement in the S/N ratio described above can be equally available in the example of FIG. 18.

Further, the positions of the pumping lights and the pumping directions in the C-band optical amplifier 120 can be modified as explained with reference to FIGS. 4–13 such as forward pumping, backward pumping and bidirectional pumping. In such modified version, the improvement in the S/N ratio described above can be equally available.

The wavelength selective WDM coupler 40 shown in FIGS. 15 and 18 are merely an example for illustration purpose. Various other forms are possible within the scope of the present invention. For example, separate components of a WDM coupler and an optical filter can also be used in which the WDM coupler functions for coupling the pump light while the optical filter functions to block or attenuate the C-band or shorter wavelengths.

As has been described, according to the present invention, the wideband optical amplifier can eliminate expensive optical components by a series connection of the first and second optical amplifiers. Thus, significant cost reduction as well as reduction in size can be achieved. Moreover, the fiber length of the second erbium doped optical fiber is decreased, and the power level of the pump light for pumping the second erbium doped optical fiber can be accordingly decreased, resulting in further reduction in size and cost. The wideband variable wavelength optical source using the wideband optical amplification can also achieve the same advantages noted above. Further, the wideband optical amplifier can improve the signal-to-noise (S/N) ratio in the L-band amplification by incorporating a filter function that blocks the amplified spontaneous emission (ASE) in the C-band wavelength.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A wideband optical amplifier having at least two bands of wavelength for amplifying an input optical signal of known wavelength, comprising:
   a first set of a first optical coupler, a first pump light source, and a first erbium doped optical fiber which is excited by a first pump light from the first pump light source;
   an optical switch for changing paths for an output signal of the first set; and
   a second set of a second optical coupler, a second pump light source, and a second erbium doped optical fiber which is excited by a second pump light from the second pump light source;
   wherein the first set amplifies a first optical signal with a first band of wavelength and produces the output signal at the optical switch, and wherein a combination of the first set and the second set series connected with one another through the optical switch amplifies a second optical signal with a second band of wavelength; and
   wherein either the first optical signal or the second optical signal is commonly supplied to an input terminal of the first set.

2. A wideband optical amplifier as defined in claim 1, wherein the first and second erbium doped optical fibers in the first and second sets are adjusted in lengths and/or density of erbium doping to match the first and second bands of wavelength.

3. A wideband optical amplifier as defined in claim 1, wherein the wavelength of the first band is shorter than that of the second band, and wherein the second band of wavelength is established by a sum of lengths of the first and second erbium doped optical fibers in the first and second sets.

4. A wideband optical amplifier as defined in claim 1, wherein the first band of wavelength is a C-band ranging from 1.53 $\mu$m to 1.565 $\mu$m, and the second band of wavelength is an L-band ranging from 1.565 $\mu$m to 1.60 $\mu$m.

5. A wideband optical amplifier as defined in claim 1, wherein the wideband optical amplifier includes a first optical amplifier configured by the first set for amplifying the first optical signal and a second optical amplifier configured by the first set and the second set series connected with one another for amplifying the second optical signal wherein the first optical amplifier, comprising:
   a first optical isolator for providing the input optical signal in a forward direction toward the first erbium doped optical fiber and blocking optical components from propagating in a backward direction;
   the first erbium doped optical fiber is adjusted its length and/or doping density to match the first band of wavelength;
   the first pump light is provided to the first erbium doped optical fiber through the first optical coupler; and
   a second optical isolator for providing the input optical signal in the forward direction toward an output terminal of the first optical amplifier and blocking optical components from propagating in the backward direction.

6. A wideband optical amplifier as defined in claim 5, wherein the second optical amplifier, comprising:
   the first optical amplifier including the first erbium doped optical fiber which is adjusted its length and/or doping density to match the first band of wavelength;
   the second erbium doped optical fiber is adjusted its length and/or doping density in combination with the first erbium doped optical fiber to match the second band of wavelength;
   the second pump light is provided to the second erbium doped optical fiber through the second optical coupler; and
   a third optical isolator for providing an optical signal from the second erbium doped optical fiber in the forward direction toward an output terminal of the second optical amplifier and blocking optical components from propagating in the backward direction.

7. A wideband optical amplifier as defined in claim 5, wherein the second optical amplifier, comprising:
   the first optical amplifier including the first erbium doped optical fiber which is adjusted its length and/or doping density to match the first band of wavelength;
   the second erbium doped optical fiber is adjusted its length and/or doping density in combination with the first erbium doped optical fiber to match the second band of wavelength;
   the second pump light is provided to the second erbium doped optical fiber through the second optical coupler;
   a third pump light for pumping the second erbium doped optical fiber through a third optical coupler; and
   a third optical isolator for providing an optical signal from the second erbium doped optical fiber in the forward direction toward an output terminal of the second optical amplifier and blocking optical components from propagating in the backward direction.

8. A wideband optical amplifier as defined in claim 5, wherein the first optical isolator, the first erbium doped optical fiber, the first pump light, and the second optical isolator are connected in this order, in the first optical amplifier, in a direction from an input terminal to an output terminal of the first optical amplifier.

9. A wideband optical amplifier as defined in claim 5, wherein the first optical isolator, the first pump light, the first erbium doped optical fiber, and the second optical isolator are connected in this order, in the first optical amplifier, in a direction from an input terminal to an output terminal of the first optical amplifier.

10. A wideband optical amplifier as defined in claim 6, wherein the first optical amplifier, the second pump light, the second erbium doped optical fiber, and the third optical isolator are connected in this order, in the second optical amplifier, in a direction from an input terminal to an output terminal of the second optical amplifier.

11. A wideband optical amplifier as defined in claim 6, wherein the first optical amplifier, the second erbium doped optical fiber, the second pump light, and the third optical isolator are connected in this order, in the second optical amplifier, in a direction from an input terminal to an output terminal of the second optical amplifier.

12. A wideband optical amplifier as defined in claim 7, wherein the first optical amplifier, the second pump light, the second erbium doped optical fiber, the third pump light, and the third optical isolator are connected in this order, in the second optical amplifier, in a direction from an input terminal to an output terminal of the second optical amplifier.

13. A wideband variable wavelength optical source for generating an optical signal in one of at least two bands of wavelength, comprising:
    a first optical amplifier having a first optical coupler, a first pump light source, and a first erbium doped optical fiber which is exited by a first pump light from the first pump light source, the first optical amplifier amplifying a first optical signal with a first band of wavelength; an optical switch for changing paths for an output signal of the first optical amplifier;
    an amplifier block having a second optical coupler, a second pump light source, and a second erbium doped optical fiber which is excited by a second pump light from the second pump light source;
    a second optical amplifier formed by connecting the first optical amplifier and the amplifier block in series through the optical switch, the second optical amplifier amplifying a second optical signal with a second band of wavelength which is longer than that of the first band;
    a variable wavelength optical filter for selecting a wavelength of either the first optical signal or the second optical signal to be generated by the wideband variable wavelength optical source; and
    an optical demultiplexer for forming a closed loop by returning either the first or second optical signals selected by the variable wavelength optical filter to an input of the first optical amplifier and producing the selected optical signal as an output optical signal.

14. A wideband variable wavelength optical source as defined in claim 13, wherein the first and second erbium doped optical fibers are adjusted in lengths and/or density of erbium doping to match the first and second bands of wavelength.

15. A wideband variable wavelength optical source as defined in claim 13, wherein a length of the first erbium doped optical fiber is adjusted to match the first band of wavelength and a sum of lengths of the first erbium doped optical fiber and the second erbium doped optical fiber is adjusted to match the second band of wavelength.

16. A wideband variable wavelength optical source as defined in claim 13, wherein the first optical amplifier further comprising:
    a first optical isolator for providing the input optical signal in a forward direction toward the first erbium doped optical fiber and blocking optical components from propagating in a backward direction; and
    a second optical isolator for providing the input optical signal in the forward direction toward an output terminal of the first optical amplifier and blocking optical components from propagating in the backward direction.

17. A wideband variable wavelength optical source as defined in claim 13, wherein the second optical amplifier, further comprising:
    a third optical isolator for providing an optical signal from the second erbium doped optical fiber in the forward direction toward an output terminal of the second optical amplifier and blocking optical components from propagating in a backward direction.

18. A wideband optical amplifier having at least two bands of wavelength for amplifying an input optical signal of known wavelength, comprising:
    a first optical amplifier for amplifying a first band optical signal and formed of a first optical coupler, a first pump light source, and a first erbium doped optical fiber which is excited by a first pump light from the first pump light source;
    an optical switch for changing signal paths for an output signal of the first optical amplifier; and
    a second optical amplifier for amplifying a second band optical signal which is longer in wavelength than that of the first band and formed of the first optical amplifier and a second amplifier block having a second optical coupler, a second pump light source, and a second erbium doped optical fiber which is excited by a second pump light from the second pump light source, the first optical amplifier and the second amplifier block being connected in series with one another through the optical switch;
    wherein either the first band optical signal or the second band optical signal is commonly supplied to an input terminal of the first optical amplifier; and
    wherein the second optical amplifier includes, within the second amplifier block after the second erbium doped optical fiber, means for blocking an amplified spontaneous emission (ASE) light in the first band from propagating to an output of the second optical amplifier.

19. A wideband optical amplifier as defined in claim 18, wherein the means for blocking the amplified spontaneous emission (ASE) light in the first band is a wavelength selective optical coupler which couples the second pump light to the second erbium doped optical fiber and prevents the ASE light in the first band from passing therethrough, thereby blocking the ASE light from propagating toward the output of the second optical amplifier.

20. A wideband optical amplifier as defined in claim 18, wherein the means for blocking the amplified spontaneous emission (ASE) light in the first band is an optical filter which prevents the ASE light in the first band from passing therethrough, thereby blocking the ASE light from propagating toward the output of the second optical amplifier.

21. A wideband optical amplifier as defined in claim 18, wherein the second erbium doped optical fiber is excited by the pump light through either backward pumping where the pump light propagates in a backward direction to the second erbium doped optical fiber or bidirectional pumping where the pump light propagates in both backward and forward directions to the second erbium doped optical fiber.

22. A wideband optical amplifier as defined in claim 18, wherein the second erbium doped optical fiber is excited by the amplified spontaneous emission (ASE) light in the first band from the first optical amplifier and by the pump light provided in the second amplifier block.

23. A wideband optical amplifier as defined in claim 18, wherein the first band optical signal is a in C-band (1.53–1.565 µm) and the second band optical signal is in an L-band (1.565–1.60 µm).

24. A wideband optical amplifier as defined in claim 19, wherein the wavelength selective optical coupler is a wavelength division multiplexing (WDM) coupler formed of a plurality of thin films made of dielectric material overlapped with one another.

25. A wideband optical amplifier having at least two bands of wavelength for amplifying an input optical signal of known wavelength, comprising:

a first optical amplifier for amplifying an optical signal in a first band and formed of a first optical coupler, a first pump light source, and a first erbium doped optical fiber which is excited by a first pump light from the first pump light source;

an optical switch for changing signal paths for an output signal of the first optical amplifier; and a second optical amplifier for amplifying an optical signal in a second band which is longer in wavelength than that of the first band and formed of the first optical amplifier and a second amplifier block having a second optical coupler, a second pump light source, and a second erbium doped optical fiber which is excited by a second pump light from the second pump light source, the first optical amplifier and the second amplifier block being connected in series with one another through the optical switch;

wherein either the first band optical signal or the second band optical signal is commonly supplied to an input terminal of the first optical amplifier; and wherein a sum of lengths of the first erbium doped optical fiber and the second erbium doped optical fiber is adjusted to match the second band, and wherein the second optical amplifier includes, within the second amplifier block after the second erbium doped optical fiber, means for blocking an amplified spontaneous emission (ASE) light in the first band from propagating to an output of the second optical amplifier.

26. A wideband optical amplifier as defined in claim 25, wherein the means for blocking the amplified spontaneous emission (ASE) light in the first band is a wavelength selective optical coupler which couples the second pump light to the second erbium doped optical fiber and prevents the ASE light in the first band from passing therethrough, thereby blocking the ASE light from propagating toward the output of the second optical amplifier.

27. A wideband optical amplifier as defined in claim 25, wherein the means for blocking the amplified spontaneous emission (ASE) light in the first band is an optical filter which prevents the ASE light in the first band from passing therethrough, thereby blocking the ASE light from propagating toward the output of the second optical amplifier.

28. A wideband optical amplifier as defined in claim 25, wherein the first optical amplifier further comprising:

a first optical isolator for providing the input optical signal in a forward direction toward the first erbium doped optical fiber and blocking optical components from propagating in a backward direction; and a second optical isolator for providing the input optical signal in the forward direction toward an output terminal of the first optical amplifier and blocking optical components from propagating in the backward direction.

29. A wideband optical amplifier as defined in claim 25, wherein the second optical amplifier further comprising:

a third optical isolator for providing an optical signal from the second erbium doped optical fiber in the forward direction toward an output terminal of the second optical amplifier and blocking optical components from propagating in a backward direction.

* * * * *